(12) United States Patent
Takahashi

(10) Patent No.: US 10,209,929 B2
(45) Date of Patent: Feb. 19, 2019

(54) IMAGE FORMING APPARATUS, CONTROL METHOD OF IMAGE FORMING SYSTEM AND STORAGE MEDIUM

(71) Applicant: CANON KABUSHIKI KAISHA, Tokyo (JP)

(72) Inventor: Yasuhiro Takahashi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/712,590

(22) Filed: Sep. 22, 2017

(65) Prior Publication Data
US 2018/0095701 A1 Apr. 5, 2018

(30) Foreign Application Priority Data
Sep. 30, 2016 (JP) .................. 2016-194939

(51) Int. Cl.
| | |
|---|---|
| G06F 3/12 | (2006.01) |
| G06F 9/4401 | (2018.01) |
| H04N 1/00 | (2006.01) |
| H04N 1/333 | (2006.01) |
| G06F 9/451 | (2018.01) |

(52) U.S. Cl.
CPC .......... *G06F 3/1204* (2013.01); *G06F 3/1205* (2013.01); *G06F 3/127* (2013.01); *G06F 3/1255* (2013.01); *G06F 3/1285* (2013.01); *G06F 9/4411* (2013.01); *G06F 9/451* (2018.02); *H04N 1/0092* (2013.01); *H04N 1/33315* (2013.01)

(58) Field of Classification Search
CPC .... G06F 3/1204; G06F 3/1285; G06F 3/1255; G06F 9/451; G06F 9/4411; G06F 3/127; G06F 3/1205; G06F 3/1257; H04N 1/33315; H04N 1/0092; H04N 1/0095
See application file for complete search history.

(56) References Cited

U.S. PATENT DOCUMENTS

| 9,122,975 B2 | 9/2015 | Inui |
|---|---|---|
| 9,415,613 B2 | 8/2016 | Inui |

FOREIGN PATENT DOCUMENTS

| JP | 2006-139109 | 6/2006 |
|---|---|---|
| JP | 2015-3476 | 1/2015 |

OTHER PUBLICATIONS

U.S. Appl. No. 15/787,348, filed Oct. 18, 2017, by Yuichiro Shibuya et al.

*Primary Examiner* — Christopher D Wait
(74) *Attorney, Agent, or Firm* — Venable LLP

(57) ABSTRACT

A controller executes a mode in an image forming apparatus in which an image is formed on a sheet by an image forming portion even if a sheet size included in an image forming job is inconsistent with a sheet size stored in the storage portion. In such a mode, the controller executes an operation by which an image having an orientation corresponding to a sheet orientation stored in the storage portion is formed on the sheet if a sheet orientation included in the image forming job is inconsistent with the sheet orientation stored in the storage portion.

16 Claims, 17 Drawing Sheets

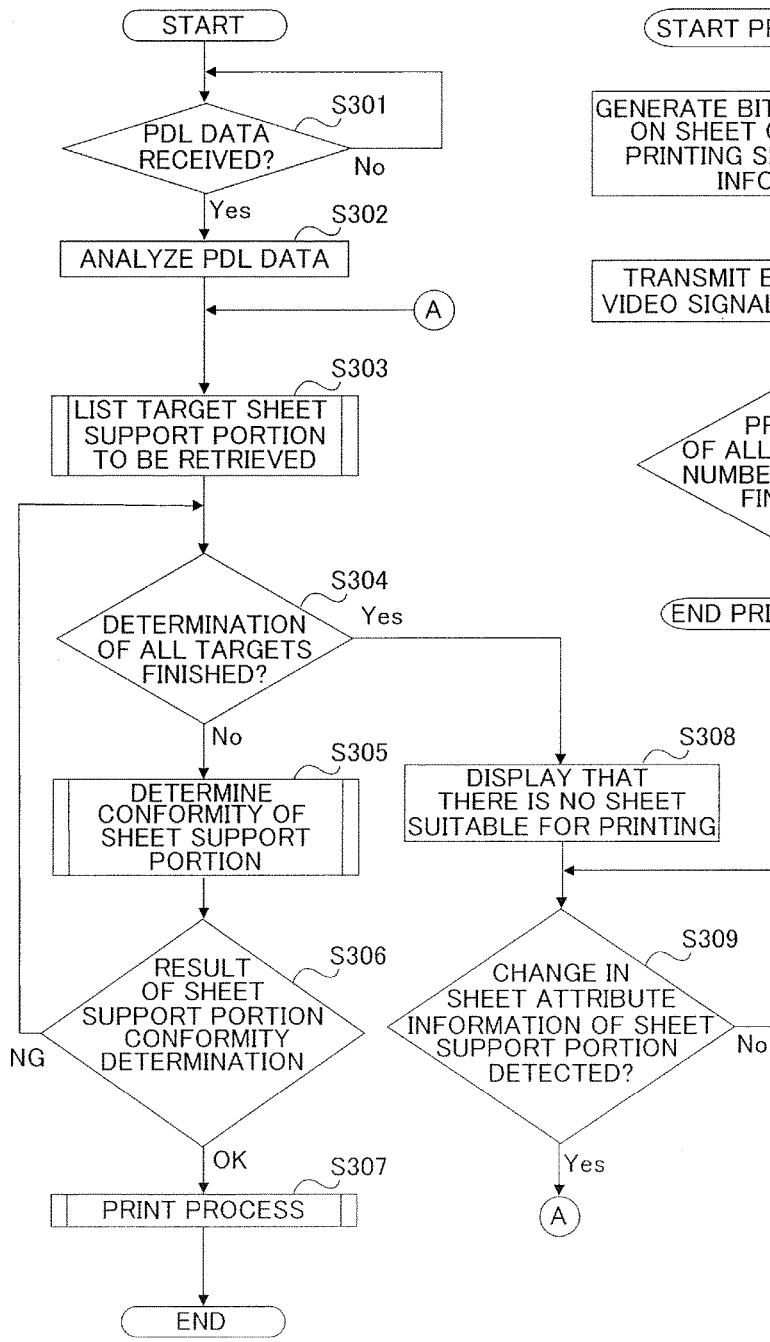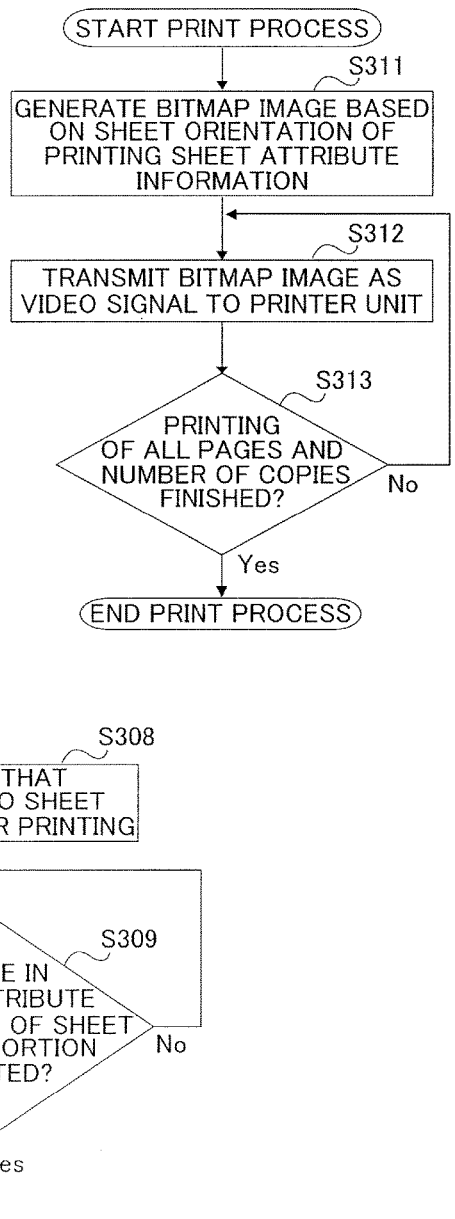
FIG.9A
FIG.9B

IMAGE FORMING APPARATUS, CONTROL METHOD OF IMAGE FORMING SYSTEM AND STORAGE MEDIUM

BACKGROUND OF THE INVENTION

Field of the Invention

The present disclosure relates to an image forming apparatus configured to form an image on a recording medium, a control method of an image forming system including the image forming apparatus, and a storage medium storing a program to cause a computer to execute the control method.

Description of the Related Art

Image forming apparatuses are provided with sheet support portions to support sheets, which are used as recording media, such as a sheet feed cassette and a manual feed tray. A control unit of the image forming apparatus recognizes attributes of the sheet placed on the sheet support portion, e.g., a sheet size, a sheet orientation and a sheet type, inputted by a user through an operation portion of the image forming apparatus. Then, when an image forming job is received, the control unit executes the image forming job after determining whether the sheet attribute information specified by the image forming job conforms to sheet attribute information set for the sheet support portion.

Japanese Patent Application Laid-open No. 2015-003476 discloses an image forming apparatus which allows re-setting of sheet information, such as a sheet size, to be omitted in terms of the manual feed tray if sheets run short in executing the image forming job. This configuration is aiming to relieve an operational burden of the user so that the user is not required to set the sheet information every time the user replenishes the sheets.

By the way, the image forming job includes a PDL job described in Page Description Language (referred to as a 'PDL' hereinafter) and transmitted from a host computer to the image forming apparatus. However, in a case where the PDL job is inputted into the image forming apparatus, the user is required to carry out both operations of setting sheet attribute information through a driver software and sheet attribute information through the operation portion of the image forming apparatus.

Then, it is conceivable to provide a mode of executing the job by preferentially using the sheet attribute information included in the PDL job in a case of the PDL job, independently from the arrangement as described in the above-mentioned document, which allows the input of the sheet attribute information to be omitted only when the sheets run short. It is possible to expect to relieve the operational burden of the user in executing the PDL job because the setting operation conducted through the operation portion can be omitted when such mode is adopted.

However, there may be a case where an output image expected by the user is not obtained if the sheet attribute information included in the PDL job is uniformly used in all cases. That is, there is a case where a sheet orientation included in the PDL job is different from a sheet orientation of the sheet placed on the sheet support portion when using a sheet of a certain size which can be placed in either direction of a short edge feed orientation and a long edge feed orientation. In this case, an image is formed on the sheet in a condition in which image data inputted to the driver software is rotated by 90 degrees with respect to the actual sheet orientation, thus an image having an orientation different from the orientation expected by the user is outputted.

SUMMARY OF THE INVENTION

The present disclosure provides an image forming apparatus configured to output an image in an orientation expected by a user, a control method of an image forming system, and a storage medium storing a program causing a computer to execute the control method.

One aspect of the present invention is an image forming apparatus including: a sheet support portion configured to support a sheet; an image forming portion configured to form an image on the sheet fed from the sheet support portion; a storage portion configured to store information of a sheet size and a sheet orientation of the sheet supported on the sheet support portion; and a controller having a processor and configured to execute, in a case where an image forming job is inputted, one of a plurality of modes including a first mode and a second mode. The first mode is a mode in which an image is formed on the sheet by the image forming portion only if a sheet size included in the image forming job is consistent with the sheet size stored in the storage portion, and the second mode is a mode in which an image is formed on the sheet by the image forming portion even if the sheet size included in the image forming job is inconsistent with the sheet size stored in the storage portion. The controller is configured to execute, in the second mode, a first operation by which an image corresponding to a sheet orientation included in the image forming job is formed on the sheet if the sheet orientation included in the image forming job is consistent with the sheet orientation stored in the storage portion, and an image corresponding to the sheet orientation stored in the storage portion is formed on the sheet if the sheet orientation included in the image forming job is inconsistent with the sheet orientation stored in the storage portion.

Another aspect of the present invention is an image forming apparatus including: a sheet support portion configured to support a sheet; a size detection portion configured to detect a size of the sheet supported by the sheet support portion; an image forming portion configured to form an image on the sheet fed from the sheet support portion; a storage portion configured to store information of a sheet size and a sheet orientation of the sheet supported on the sheet support portion, and information indicating whether an input-free setting that allows to omit an input of the sheet size and the sheet orientation is enabled or disabled; and a controller having a processor and configured to execute, in a case where an image forming job is inputted, one of a plurality of modes including a first mode and a second mode. The first mode is a mode in which an image is formed on the sheet by the image forming portion only if a sheet size included in the image forming job is consistent with the sheet size stored in the storage portion, and the second mode is a mode in which an image is formed by the image forming portion even if the sheet size included in the image forming job is inconsistent with the sheet size stored in the storage portion. In a case where the controller executes the second mode with the input-free setting enabled, the controller is configured to execute an operation by which an orientation of an image to be formed on the sheet by the image forming portion is changed depending on the size of the sheet detected by the size detection portion.

Still another aspect of the present invention is a control method of an image forming system that includes an image forming apparatus and a host computer in which a driver software to generate an image forming job is installed. The image forming apparatus includes: a sheet support portion configured to support a sheet; an image forming portion configured to form an image on the sheet fed from the sheet support portion; and a storage portion configured to store information of a sheet size and a sheet orientation of the sheet supported on the sheet support portion, wherein the image forming apparatus is configured to execute, in a case where the image forming apparatus receives the image forming job from the host computer, one of a plurality of modes including a first mode and a second mode, wherein the first mode is a mode in which an image is formed on the sheet by the image forming portion only if a sheet size included in the image forming job is consistent with the sheet size stored in the storage portion, and the second mode is a mode in which an image is formed on the sheet by the image forming portion even if the sheet size included in the image forming job is inconsistent with the sheet size stored in the storage portion. The control method includes: obtaining information of the sheet stored in the storage portion, information of the mode to be executed by the image forming apparatus upon receiving the image forming job, and input image data and a sheet orientation inputted into the driver software; setting an orientation, with respect to the sheet to be fed from the sheet support portion, of an output image data to be formed into an image by the image forming portion, the orientation of the output image data being determined based on a result of the obtaining step; and generating the output image data based on the input image data obtained by the obtaining step and the orientation of the output image data set by the setting step, wherein in a case where the information obtained by the obtaining step indicates that the second mode is executed by the image forming apparatus upon receiving the image forming job, the setting step is performed such that an orientation corresponding to the sheet orientation included in the image forming job is set as the orientation of the output image data if the sheet orientation inputted into the driver software and the sheet orientation stored in the storage portion are consistent, and an orientation corresponding to the sheet orientation stored in the storage portion is set as the orientation of the output image data if the sheet orientation inputted into the driver software and the sheet orientation stored in the storage portion are inconsistent.

Still another aspect of the present invention is a control method of an image forming system that includes an image forming apparatus and a host computer in which a driver software to generate an image forming job is installed. The image forming apparatus includes: a sheet support portion configured to support a sheet; a size detection portion configured to detect a size of the sheet supported by the sheet support portion; an image forming portion configured to form an image on the sheet fed from the sheet support portion; and a storage portion configured to store information of a sheet size and a sheet orientation of the sheet supported on the sheet support portion and information indicating whether an input-free setting that allows to omit an input of the sheet size and the sheet orientation is enabled or disabled, wherein the image forming apparatus is configured to execute, in a case where the image forming apparatus receives the image forming job from the host computer, one of a plurality of modes including a first mode and a second mode, wherein the first mode is a mode in which an image is formed on the sheet by the image forming portion only if a sheet size included in the image forming job is consistent with the sheet size stored in the storage portion, and the second mode is a mode in which an image is formed on the sheet by the image forming portion even if the sheet size included in the image forming job is inconsistent with the sheet size stored in the storage portion. The control method includes: obtaining information of the sheet stored in the storage portion, information of the input-free setting, information of the mode to be executed by the image forming apparatus upon receiving the image forming job, and input image data and a sheet orientation inputted into the driver software; setting an orientation, with respect to the sheet to be fed from the sheet support portion, of an output image data to be formed into an image by the image forming portion, the orientation of the output image data being determined based on a result of the obtaining step; and generating the output image data based on the input image data obtained by the obtaining step and the orientation of the output image data set by the setting step, wherein in a case where the information obtained by the obtaining step indicates that the second mode is executed by the image forming apparatus upon receiving the image forming job and that the input-free setting is enabled, the setting step is performed such that either orientation of the sheet orientation inputted into the driver software and the sheet orientation stored in the storage portion is set as the orientation of the output image data depending on the size of the sheet detected by the size detection portion.

Further features of the present invention will become apparent from the following description of exemplary embodiments with reference to the attached drawings.

BRIEF DESCRIPTION OF THE DRAWINGS

FIG. 9A is a flowchart illustrating a procedure of a PDL job execution process.

FIG. 9B is a flowchart illustrating a procedure of a printing process included in the PDL job execution process.

DESCRIPTION OF THE EMBODIMENTS

An image forming apparatus of the present disclosure will be described below with reference to the drawings.

First Embodiment

Figure 1:
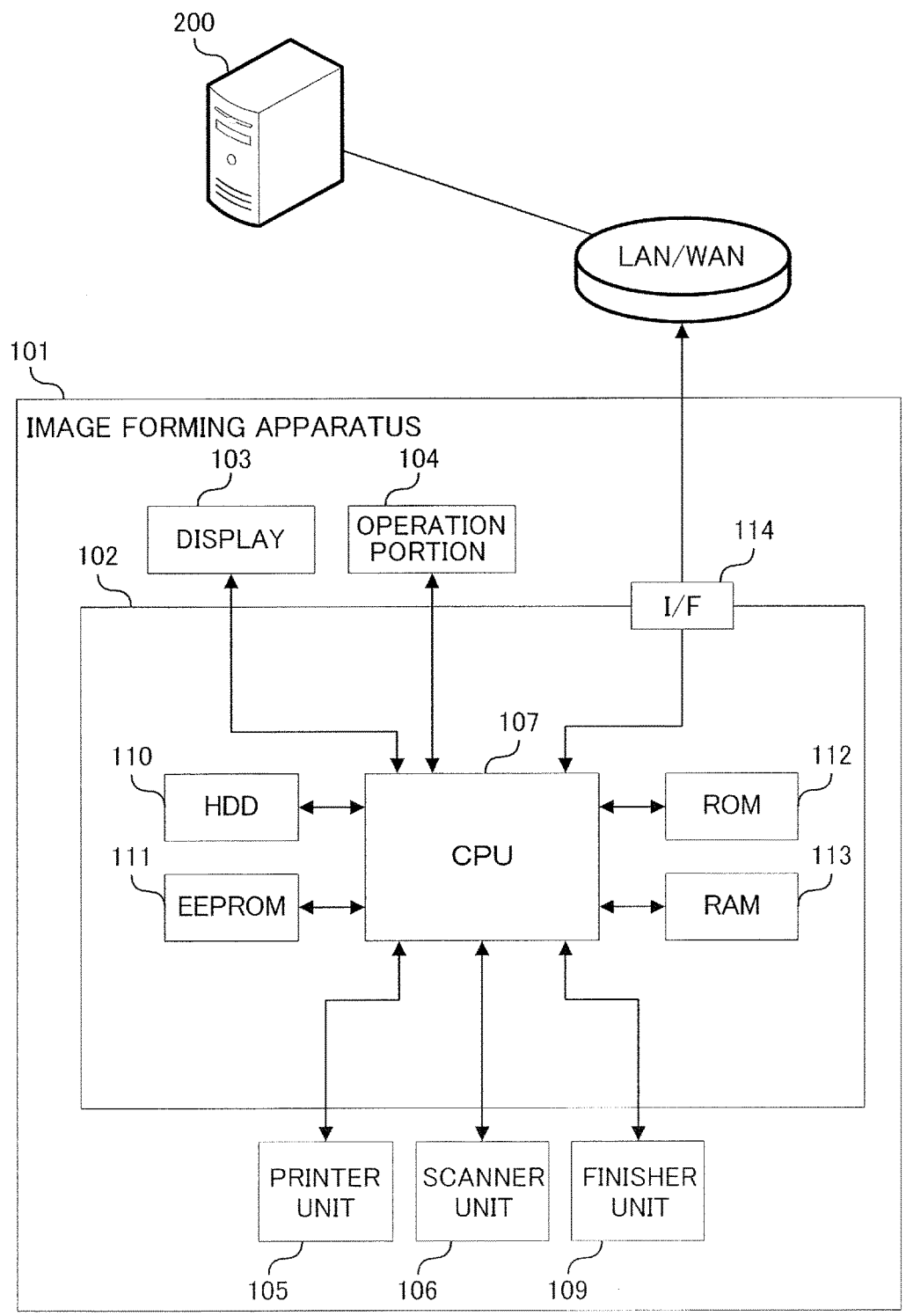
FIG. 1 is a block diagram illustrating an overall configuration of an image forming system of the present disclosure.

FIG. 1 illustrates a schematic configuration of an image forming system including an image forming apparatus 101 of the present embodiment. The image forming apparatus 101 includes a function unit including a printer unit 105, a scanner unit 106 and a finisher unit 109, and a display 103 and an operation portion 104 which are user interfaces. The image forming apparatus 101 also includes a control unit 102 configured to control these devices.

The display 103 includes a LED as a display lamp or liquid crystal display, and displays a result of an operation made by a user and an internal condition of the apparatus. The operation portion 104 includes a control structure for realizing a touch panel function of the display 103 and receives the operation of the user and transmits it to the control unit 102 as an electronic signal.

The scanner unit 106 is configured to scan a document based on an instruction made by the control unit 102 to read image data and to transmit the obtained image data to the control unit 102. The printer unit 105 is configured to execute an image forming operation, i.e., a printing operation, by receiving the instruction from the control unit 102. The finisher unit 109 implements, by receiving the instruction from the control unit 102, a process such as stapling of the sheet on which an image has been formed by the printer unit 105 and discharge it out of the apparatus.

The control unit 102 consists of a control circuit including a CPU 107, a HDD 110, an EEPROM 111, a ROM 112, and a RAM 113. 'CPU' is an abbreviation of a central processing unit, 'ROM' is that of a read only memory, 'HDD' is that of a hard disk drive, and 'EEPROM' represents an electrically rewritable nonvolatile memory.

The CPU 107 is an execution medium of a control program stored in the ROM 112 or other storage portion and is configured to control mechanical and electrical operations of the devices connected to the control unit 102. For instance, the CPU 107 causes the printer unit 105 to carry out an image forming operation to execute an image forming job. Here, the image forming job is a task of the image forming operation to be executed by the control unit 102 and specifically refers to a data stream including image data of each page, a number of copies, a size and a type of a sheet, setting of a function such as duplex printing and stapling, and other necessary information. The image forming job includes (i) a copy job generated by the control unit 102 based on image data obtained by the scanner unit 106, and (ii) a PDL job inputted from an outside and described later.

The ROM 112 stores a boot program and others required for starting the system, and the RAM 113, i.e., a volatile memory, is used as a working memory in executing the control program. The HDD 110 is a storage medium such as a magnetic disk and stores the control program, image data, and other data. The EEPROM 111 stores values of configuration variables required in executing the control program.

The CPU 107 is one exemplary controller configured to control the image forming apparatus 101. It is noted that each processing step of the following flowcharts illustrating a procedure for controlling the image forming apparatus 101 will be executed by the CPU 107 unless specified otherwise. Each of the ROM 112, the RAM 113, the HDD 110 and the EEPROM 111 is also an exemplary storage portion capable of temporarily or permanently storing information based on an instruction of the controller. For example, the ROM 112 stores programs for causing the CPU 107 to execute each step of the flowcharts. The EEPROM 111 stores information, e.g., a sheet size, a sheet type and a type-free setting, related to each sheet support portion described later.

The CPU 107 is connected with a local or wide area network (LAN/WAN) through the network interface (I/F) 114 serving as a transmission/reception device. The control unit 102 can transmit/receive data with a host computer such as a personal computer (PC) 200. For instance, the CPU 107 receives an image forming job (referred to as a 'PDL job' hereinafter) described in a Page Description Language (PDL) from the PC 200. The CPU 107 also transmits an internal state of the image forming apparatus 101 such as progress of the image forming job and a remaining amount of sheets to the host computer.

Hardware Structure of Image Forming Apparatus

Figure 2A:
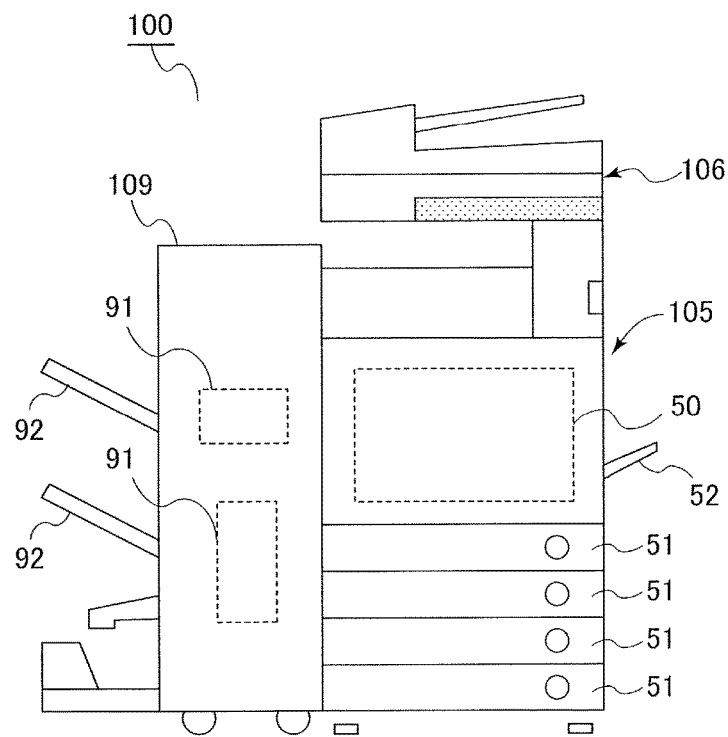
FIG. 2A is a front view illustrating an appearance of an image forming apparatus.

Next, a hardware structure of the image forming apparatus 101 will be described with reference to FIGS. 2A through 2C. As illustrated in FIG. 2A, the printer unit 105 of the image forming apparatus 101 includes an image forming engine 50 disposed within the apparatus body, i.e., a housing of the image forming apparatus, and a plurality of sheet support portions (51, 52) configured to support sheets as recording media. Here, the sheets include, besides a plain paper, a special paper such as a coated sheet, a recording medium having a specific shape such as an envelope and an index sheet, a plastic film for an overhead projector, and a cloth. It is noted that while a term 'sheet' is used in the following description and in the drawings, it refers to a sheet of a material that may be other than paper, unless otherwise specified.

Figure 2B:
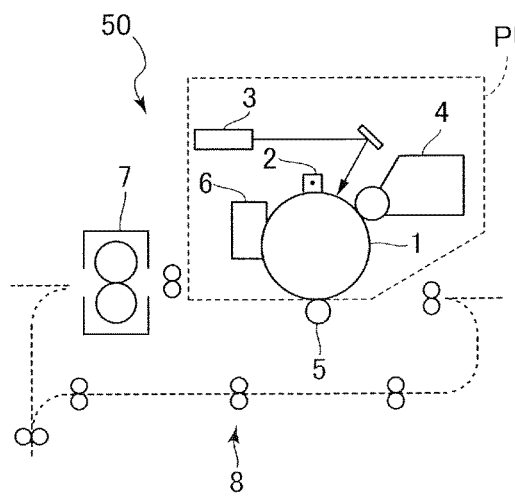
FIG. 2B is a schematic diagram illustrating a configuration of an image forming engine.

As illustrated in FIG. 2B, the image forming engine 50 of the present embodiment includes an electrophotographic image forming unit PU. In response to an instruction to start the image forming operation, a photosensitive drum 1 serving as a photoconductor rotates, and a surface of the drum is uniformly electrified by a charging unit 2. Then, an exposure unit 3 emits a laser beam modulated based on image data transmitted from the control unit 102 and scans the surface of the photosensitive drum 1 to form an electrostatic late image. This electrostatic latent image is visualized by toner supplied from a developing unit 4 as a toner image.

In parallel with such image forming operation, a feed operation of feeding a sheet supported by either one of the sheet support portions (51 and 52) to the image forming engine 50 is executed. As illustrated in FIG. 2A, the sheet support portions include a plurality of sheet feed cassettes 51 each attached drawably to the housing of the printer unit 105 and the manual feed tray 52 disposed on a side surface of the housing.

The CPU 107 recognizes sheet attribute information related to attributes of the sheet placed in the respective cassette 51 and the manual feed tray 52 through an operation of the user made through the operation portion 104. The attribute of the sheet is a generic name of features such as a sheet size, an orientation of the sheet, a material (e.g., a basis weight, whether a surface is treated, a raw material), a shape (e.g., index sheet, loose-leaf and the like), and a special use such as an envelope. The CPU 107 stores in the EEPROM 111 sheet attribute information directly inputted by the user and/or sheet attribute information such as size and basis weight obtained through a detection mechanism disposed at the respective sheet feed cassette 51 and the manual feed tray 52.

Figure 2C:
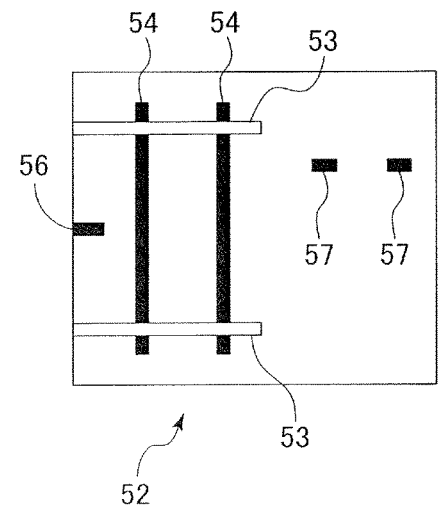
FIG. 2C is a schematic diagram illustrating a configuration of a manual feed tray.

It is noted that as illustrated in FIG. 2C, the manual feed tray 52 is provided with a sheet detection sensor 56, a pair of side guides 53 and 53, a pair of guide width sensors 54 and 54, and length detection sensors 57 and 57. The sheet detection sensor 56 is disposed at a downstream end of the manual feed tray 52 in a sheet feed direction (in a left direction in FIG. 2C) and transmits a detection signal obtained by detecting a sheet placed on the tray. The side guides 53 and 53 are movable along a rail extending in a width direction orthogonal to the sheet feed direction and detect widthwise position by the guide width sensors 54 and 54. The length detection sensors 57 and 57 are disposed at least at one place in the sheet feed direction to detect whether the sheet is present at the position where the sensor is installed. These configurations make it possible for the CPU 107 to obtain information related to the sizes of the sheets placed on the manual feed tray 52 based on detection signals from the guide width sensor 54 and the length detection sensor 57, each of which is an exemplary size detection portion.

As illustrated in FIGS. 2A and 2B, the sheets placed on the sheet feed cassette 51 and the manual feed tray 52 are fed while being separated one by one by a feed unit including a separation mechanism such as a retard roller system. The sheet supplied to the image forming engine 50 is sent to a registration portion so that a skew thereof is corrected and is conveyed in synchronism with progress of the image forming operation performed by the image forming unit PU. Then, a transfer unit 5 disposed in the image forming engine 50 transfers the toner image borne on the photosensitive drum 1 onto the sheet. The sheet onto which the non-fixed toner image has been transferred is passed to a fixing unit 7, so as to be heated and pressurized while being nipped by a roller pair. The sheet onto which the image has been fixed by thus melting and fixing the toner to the sheet is passed to a finisher unit 109 or is discharged out of the housing by a discharge member such as a discharge roller pair. In a case where duplex printing is to be carried out, the sheet that has passed through the fixing unit 7 is conveyed again to the transfer portion in a condition in which a surface and a back surface thereof are switched by a reverse conveyance portion 8 to form an image on the back surface. The sheet passed to the finisher unit 109 is conveyed to either one of sheet processing portions 91 for performing sheet processing such as stapling, a folding process and an alignment process. The sheet or a sheet bundle on which a proper process has been implemented by the sheet processing portion 91 is discharged to a discharge tray 92 outside of the housing.

It is noted while the electrophotographic image forming engine 50 has been described as one exemplary image forming apparatus in the present embodiment, another mechanism such as an inkjet system may be used as the image forming engine. Still further, even in the case of the electrophotographic type, a configuration different from the image forming engine 50 described above, such as an image forming engine capable of forming a color image by a tandem intermediate transfer type, may be used.

Driver Setting Priority Function

Next, a driver setting priority mode mounted in the image forming apparatus 101 will be described. The sheet attribute information of the sheet supported in the sheet feed cassette 51 and the manual feed tray 52 is stored in a storage portion of the EEPROM 111 or the like as described above. Meanwhile, information specifying the sheet support portion serving as a sheet supplying source and information specifying the sheet size, orientation and others are included in the PDL job receiving from the external host computer. In general, the sheet attribute information included in the PDL job is often required to be consistent with the sheet attribute information stored in the storage portion as a prerequisite for starting the image forming operation in a case of executing the PDL job. However, in this case, the user is required to carry out both setting operations of the sheet attribute information (i) through the driver software and (ii) through the operation portion of the image forming apparatus. Still further, in a case where the user carries out printing while frequently replacing a plurality of kinds of sheets having different attributes, the user is required to set the sheet attribute information every time when the user replaces the sheets, thus increasing an operational burden of the user.

Then, it is conceivable to provide a function of executing the image forming operation by preferentially using the sheet attribute information included in the PDL job with respect to the sheet attribute information stored in the storage portion related to a part or a whole of the sheet support portions provided in the image forming apparatus. Such function will be referred to as a 'driver setting priority function' hereinafter, and a mode in which the CPU 107 executes the image forming job in a state in which the driver setting priority function is valid or enabled will be referred to as a 'driver setting priority mode' hereinafter. A mode in which the CPU 107 executes the image forming job in a state in which the driver setting priority function is invalid or disabled will be referred to as a 'normal mode' hereinafter for a convenience of the description. The normal mode corresponds to a first mode in executing the image forming job, and the driver setting priority mode corresponds to a second mode in executing the image forming job.

It is noted that although the present embodiment is configured such that the driver setting priority mode is applicable only to the manual feed tray 52, it is possible to arrange such that the driver setting priority mode is applicable also to the other sheet support portion. Still further, while the present embodiment is arranged to switch whether the driver setting priority function is valid or invalid by an operation using the operation portion 104, it is also possible to arrange to make setting on the host computer through the driver software.

A setting change process for switching valid or invalid of the driver setting priority function of the present embodiment will be described with reference to FIGS. 3 and 4. Here, FIG. 3 is a flowchart illustrating the setting change process for changing the setting of the driver setting priority mode to the manual feed tray 52, and FIG. 4 is an image representing a setting change screen 401 displayed on the display 103 in the setting change process.

Figure 3:
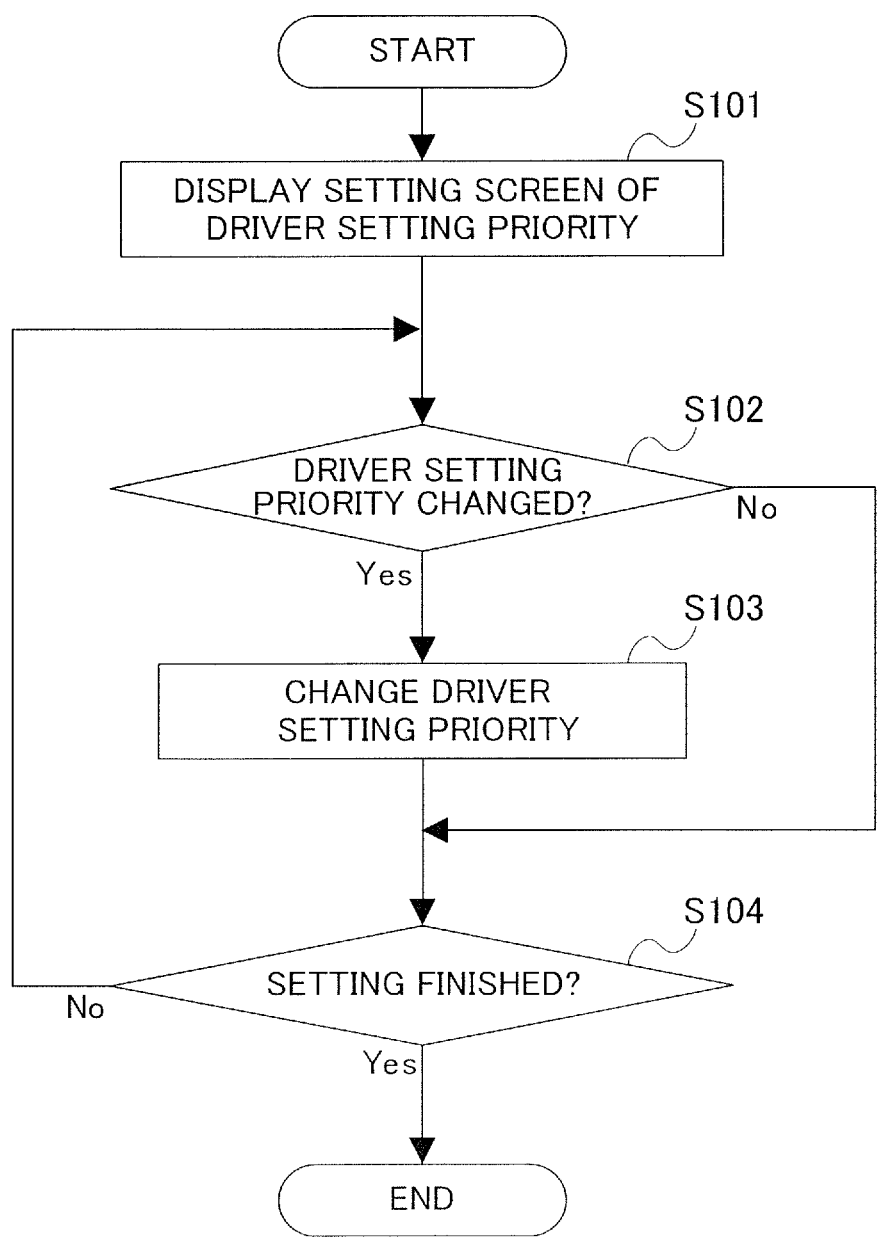
FIG. 3 is a flowchart illustrating a procedure of a setting change process of a driver setting priority function.
Figure 4:
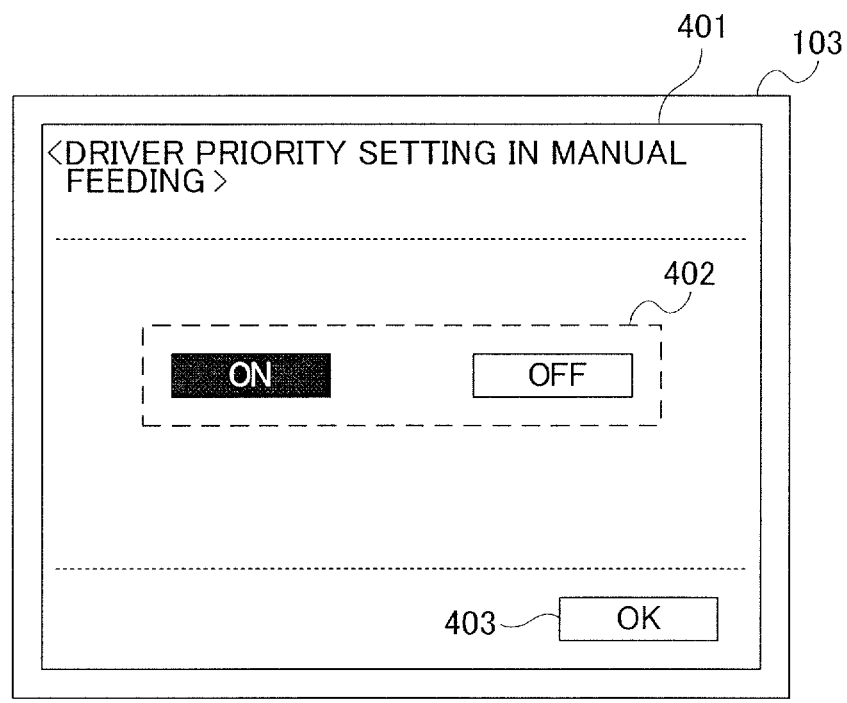
FIG. 4 is an image illustrating a setting change screen of the driver setting priority function.

The setting change process illustrated in FIG. 3 is started in a case where a setting key, displayed on the display 103 in a standby condition in which the image forming apparatus 101 stands by an input of the image forming job, is pressed. When the setting change process is started, the CPU 107 displays a setting change screen 401 (see FIG. 4) on the display 103 in Step S101 and stands by an input of a control signal of an ON/OFF key 402 and an OK key 403.

In a case where one key other than the key having been selected already is selected among the ON/OFF key 402, i.e., Yes in Step S102, the CPU 107 changes the setting related to the driver setting priority function in Step S103. Specifically, a value of a configuration variable, representing whether the driver setting priority function is valid or invalid, stored in the EEPROM 111 is rewritten. The CPU 107 receives such setting change until when the OK key 403 is pressed, and if the OK key 403 is actually pressed i.e., Yes in Step S104, the CPU 107 finishes the setting change process. In a case where the CPU receives a PDL job, the CPU 107 determines whether the driver setting priority function is valid by referring the variable stored in the EEPROM 111 as described later.

Setting Sheet Attribute

Figure 5:
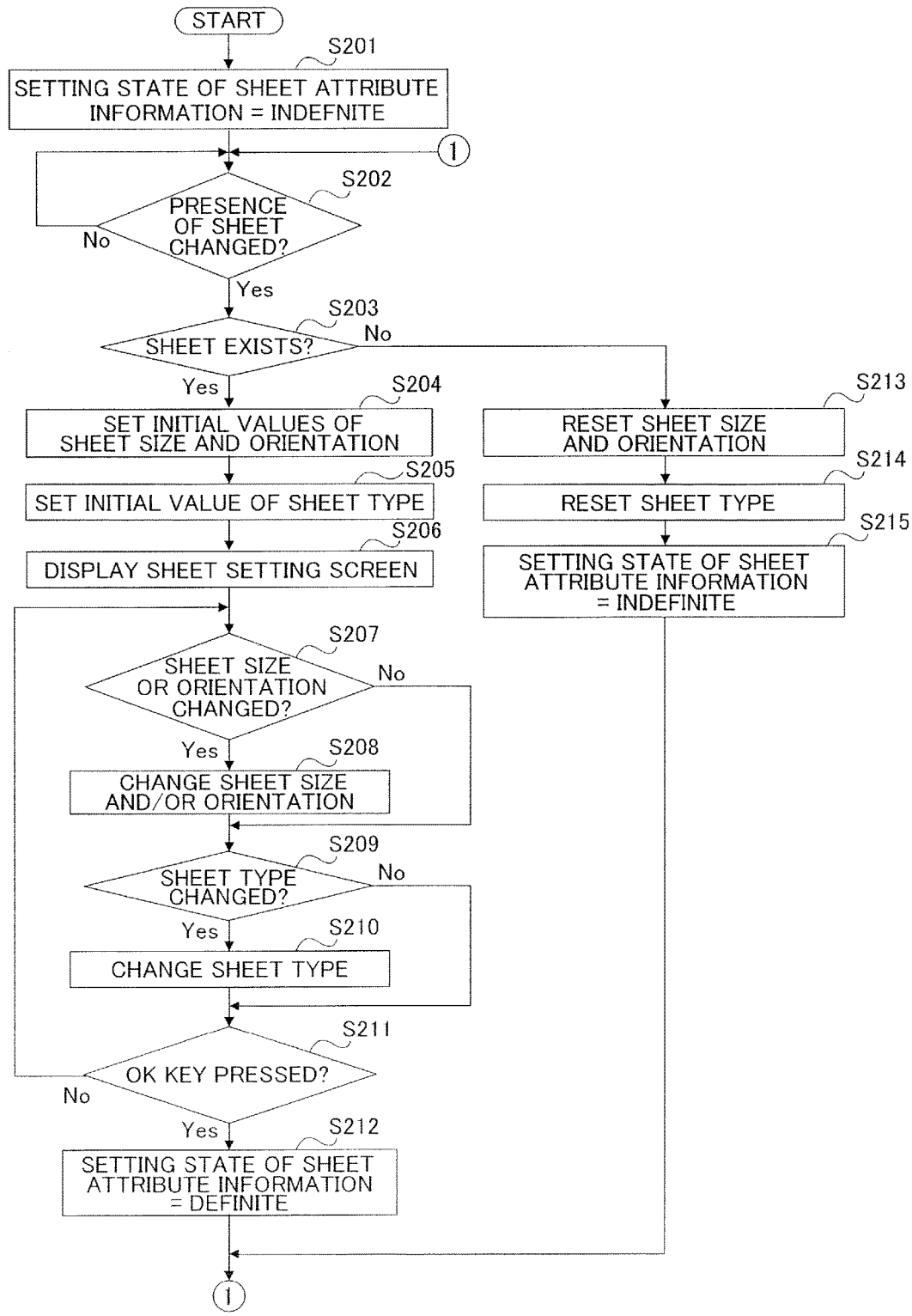
FIG. 5 is a flowchart illustrating a procedure of a setting process for a sheet attribute information related to the manual feed tray.
Figure 6:
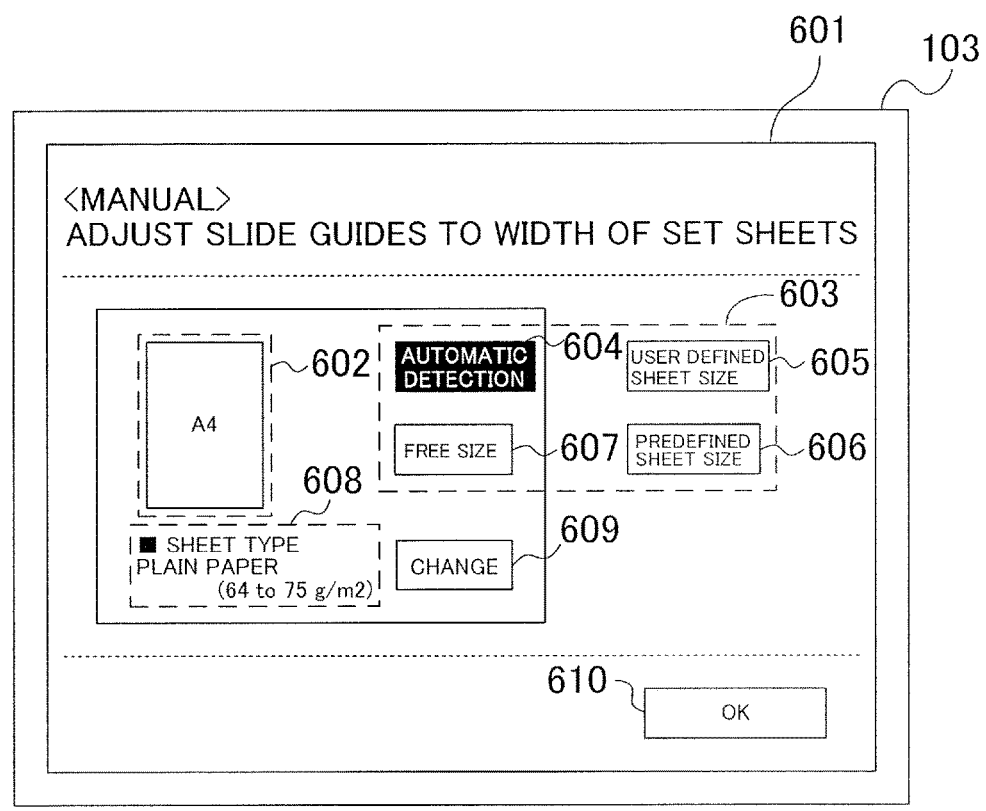
FIG. 6 is an image illustrating a sheet attribute information setting screen.
Figure 7:
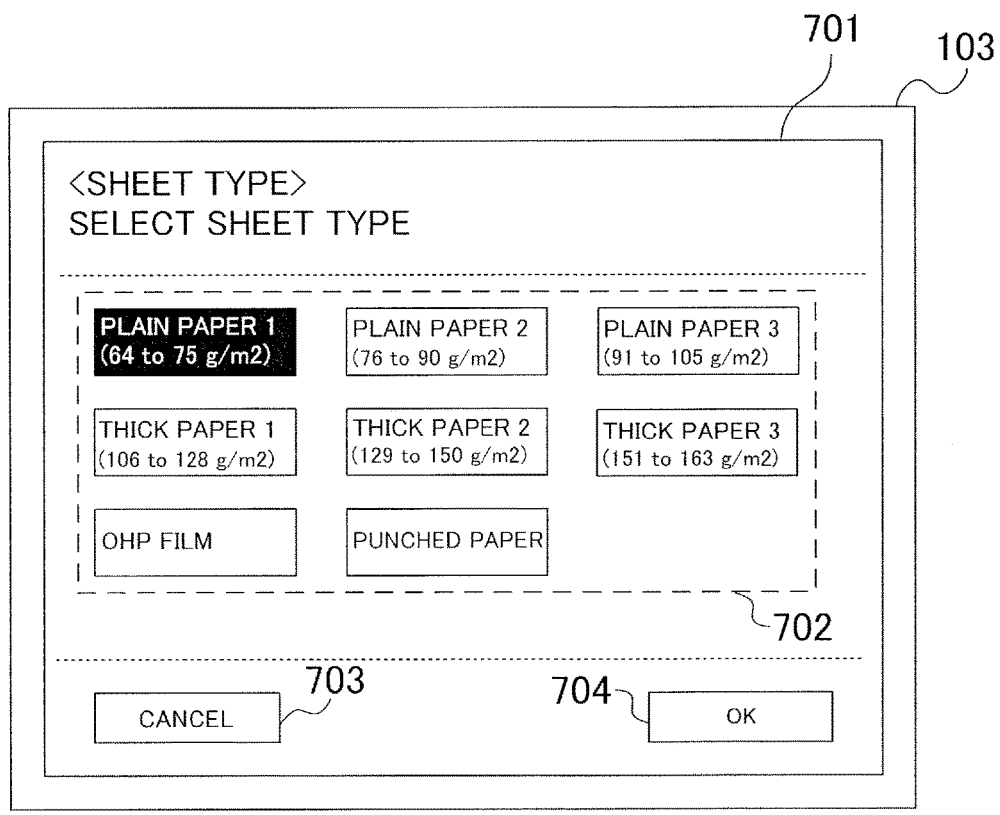
FIG. 7 is an image illustrating a sheet type selection screen.

Next, a sheet attribute setting process for setting the sheet attribute information related to a sheet placed on the manual feed tray 52 for the image forming apparatus 101 will be described with reference to FIGS. 5 through 7. Here, FIG. 5 is a flowchart illustrating a procedure of the sheet attribute setting process, and FIGS. 6 and 7 are images illustrating screens displayed on the display 103 in the sheet attribute setting process. Although the setting process targeting on the manual feed tray 52 will be described in the following description, a similar setting process may be executed also on each sheet feed cassette 51.

It is noted that the 'sheet orientation' among the sheet attributes typically refers to either one of a 'long edge feed orientation' that the long edge of the sheet is in parallel with the sheet feed direction, or a 'short edge feed orientation' that the short edge of the sheet is in parallel with the sheet feed direction. The 'sheet type' represents categories of the sheet defined by attributes other than the sheet size and the sheet orientation, and eight types of sheets as illustrated in FIG. 7 are available in the present embodiment.

The sheet attribute setting process as illustrated in FIG. 5 is constitutively executed, for example, when a main power source of the image forming apparatus 101 is ON. The CPU 107 sets a value of a 'setting state of sheet attribute information', which is a configuration variable representing whether the sheet attribute information is defined, as 'INDEFINITE' in an initial condition in Step S201. Then, if detecting a change in a detection signal of the sheet detection sensor 56 (see FIG. 2C) disposed on the manual feed tray 52 has been changed, i.e., Yes in Step S202, the CPU 107 executes a process corresponding to the change in the detection signal.

In a case where the control unit 102 detects that any sheet is placed (from absent to present) on the manual feed tray 52 through the sheet detection sensor 56, i.e., Yes in Step S203, the CPU 107 substitutes configuration variables representing the sheet size and the sheet orientation with initial values in Step S204. Here, the initial value refers to a value determined by using the size detection portions 54 and 57 disposed on the manual feed tray 52 or to pre-installed fixed value. The user specifies in advance which values should be the initial value.

The CPU 107 also substitutes a setting value representing the sheet type with an initial value in Step S205. While a pre-installed sheet type will be the initial value in the present embodiment, it is also possible to arrange such that the user can select the initial value in advance. Still further, in the case of the arrangement in which the detection mechanism capable of obtaining information related to the sheet type is disposed on the manual feed tray 52, the type determined based on a detection result may be used as the initial value.

Next, the CPU 107 displays a sheet setting screen 601 as illustrated in FIG. 6 on the display 103 in Step S206. Information representing the sheet size and the sheet orientation set at present is displayed in an area 602 of the sheet setting screen 601, and the sheet type set at present is displayed in an area 608. Accordingly, the information representing the initial value of the size and orientation and the type of the initial value are displayed at the moment when the sheet setting screen 601 is displayed.

Various operation keys 604 through 607 for changing the sheet size and the sheet orientation are displayed in the area 603 of the sheet setting screen 601. In the example illustrated in FIG. 6, an 'automatic detection' key 604 is selected, so that values specified based on the detection results of the guide width sensor 54 and the length detection sensor 57 are set as the sheet size and the sheet orientation. In a case where a 'user defined size' key 605 is pressed, a screen prompting the user to input arbitral values indicating a sheet length, i.e., a length in the sheet feed direction, and a sheet width, i.e., a length in the width direction, is displayed. In a case where a 'predefined sheet size' key 606 is pressed, a screen enabling to select size and orientation of a sheet out of a candidate group of regular size sheet is displayed. In a case where a 'free size' key 607 is pressed, a free-size function enabling the image forming apparatus 101 to execute the image forming job without inputting information related to the sheet size and orientation becomes valid.

It is noted that the setting of the free-size function is one exemplary input-free setting by which the input of the information related to the sheet size and the sheet orientation can be omitted. In a case where the input-free setting is valid, or enabled, setting values representing the sheet size and the sheet orientation are taken to be constants representing a temporary value or indefinite size. In the free-size mode of the present embodiment, a value detected by the guide width sensor 54 is assigned and a sheet length is complemented by an appropriate value. The value complemented as the sheet length is preferable to be a maximum length of the sheet size that can be supported by the image forming apparatus 101, e.g., 420 mm which is a length of a long edge of A3 size sheet.

A 'change' key 609 for changing the sheet type is displayed on the sheet setting screen 601. In a case where the 'change' key 609 is pressed, the CPU 107 carries out displaying a select screen 701 as illustrated in FIG. 7 on the display 103. In an area 702 of the select screen 701, selectable operation keys corresponding to the sheet types supported by the image forming apparatus 101 are listed. A 'cancel' key 703 for stopping the operation without changing the sheet type and an 'OK' key 704 for confirming a selection result are also displayed on the sheet setting screen 601. In a case where both the 'cancel' key 703 and the 'OK' key 704 are operated, the select screen 701 is closed and the sheet setting screen 601 is displayed.

As illustrated in FIG. 5, in a case where an operation of changing at least one of the sheet size and orientation is made during the sheet setting screen 601 is displayed, i.e., Yes in Step S207, the CPU 107 stores the changed value into the EEPROM 111 in Step S208. Still further, in a case where an operation of changing the sheet type is made, i.e., Yes in Step S209, the CPU 107 also stores the changed value into the EEPROM 111 in Step S210. Then, if the 'OK' key 610 of the sheet setting screen 601 is pressed, i.e., Yes in Step S211, the CPU 107 sets the value of the 'setting state of sheet attribute information' to 'DEFINITE' in Step S212 and returns to the standby condition in Step S202 in which the CPU 107 stands by a change of the detection signal of the sheet detection sensor 56.

In contrast to a case where the CPU 107 detects that the sheet has been removed from the manual feed tray 52 in the standby condition, i.e., No in Step S203 (from present to absent), the CPU 107 resets the information related to the sheet size and the sheet orientation and the information related to the sheet type in Steps S213 and S214. That is, the CPU 107 deletes the setting values of the sheet attribute information from the storage portion. Then, after setting the value of the 'sheet attribute information setting condition' to 'INDEFINITE' in Step, S215, the CPU 107 returns to the standby condition in Step S202.

Executing PDL Job

A procedure for executing the PDL job by the image forming apparatus 101 will be described below. At first, contents of data received by the image forming apparatus 101 as the PDL job (referred to as a 'PDL data' 800 hereinafter) will be described with reference to FIG. 8. The PDL data 800 is generated by the driver software installed in the host computer and is transmitted to the control unit 102 of the image forming apparatus 101 through a network such as LAN/WAN.

Figure 8:
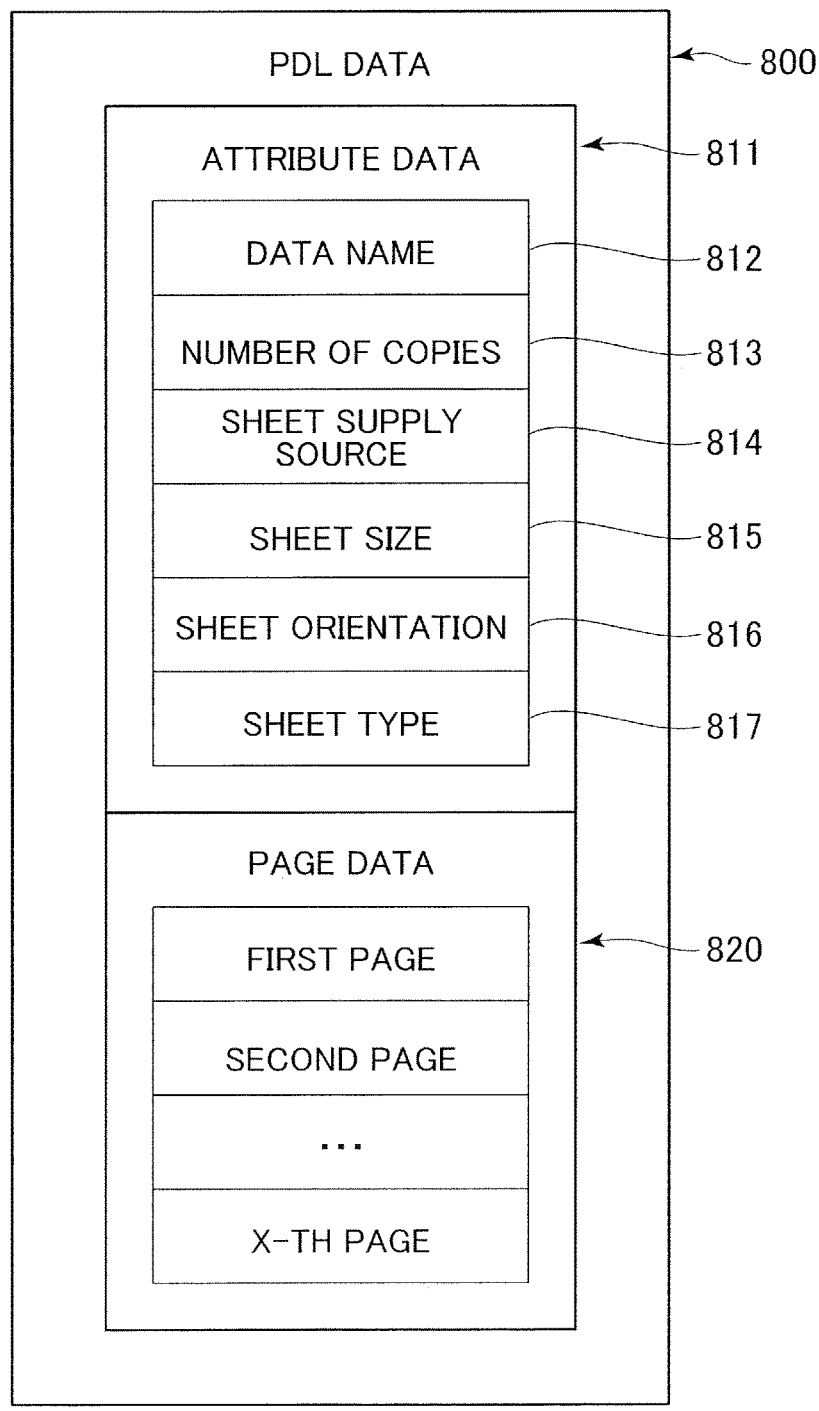
FIG. 8 is a conceptual diagram illustrating contents of PDL data transmitted as a PDL job.

As illustrated in FIG. 8, roughly the PDL data 800 includes attribute data 811 representing attributes of a job and page data 820 which includes a set of image data to be printed. The attribute data 811 includes information of a data name 812, a number of copies 813, a sheet supply source 814, a sheet size 815, a sheet orientation 816 and a sheet type 817. The data name 812 is a name for discriminating the PDL data 800 and is assigned based on a file name of application data that has provided the page data 820 to the driver software. The number of copies 813 is information indicating a number of copies to be outputted. The sheet supply source 814 is information indicating a supply source of the sheet to be used for printing. In a case where the user specifies a specific sheet support portion as the sheet supply source, a value indicating either one of the sheet feed cassettes 51 or the manual feed tray 52 is filled in the sheet supply source 814. It is noted that the specification of the sheet supply source 814 is arbitrary as for the PDL job, and a value indicating 'automatic selection' is filled in the sheet supply source 814 in a case where the user does not specify any sheet supply source.

The sheet size 815 is information indicating sheet size specified by the user. It is noted that it is essential to specify the sheet size in the PDL job in the present embodiment, and information of the sheet size 815 is always included in the PDL data 800 in the present embodiment. The sheet orientation 816 is information indicating a sheet orientation specified by the user. In a case where the user specifies no sheet orientation, the information of the sheet orientation 816 is omitted. The sheet type 817 is information indicating a sheet type specified by the user. It is noted that the specification of the sheet type 817 to the PDL job is arbitrary, and the information of the sheet type 817 is omitted in a case where the user specifies no sheet type. Still further, in a case where the function such as stapling and duplex printing mounted in the image forming apparatus 101 is to be carried out, information instructing to execute a corresponding function besides the respective information described above is included in the attribute data 811. The page data 820 includes image data 821 for each page and is described in a format of PDL supported by the image forming apparatus 101.

An outline of a procedure of an execution process for executing the PDL job will be described with reference to a flowchart of FIG. 9A. This execution process is constitutively executed in a state where the main power source of the image forming apparatus 101 is ON and proceeds timely when the CPU 107 receives the PDL data. The CPU 107 always confirms whether the PDL data 800 has been received through the network in Step S301. In a case where the PDL data 800 is received, i.e., Yes in Step S301, the CPU 107 analyzes the PDL data 800 and extracts information containing the sheet supply source 814, the sheet size 815, the sheet orientation 816 and the sheet type 817 of the attribute data 811 in Step S302.

Next, the CPU 107 prepares a list of target sheet support portions to be retrieved, among the sheet support portions of the image forming apparatus 101, from which one cannot be a sheet supply source is excluded based on the information of the sheet supply source 814 in Step S303. Then, the CPU 107 executes a sheet-support-portion conformity determination process in Step S305 for determining sequentially whether the sheet support portions included in the prepared list are suitable as a sheet supply source in the image forming operation in Steps S304 through S306.

In a case where any one of the target sheet support portions to be retrieved is determined to be OK (conformable) through the sheet-support-portion conformity determination process, i.e., OK in Step S306, the CPU 107 carries out printing in Step S307. That is, the CPU 107 executes a printing process, i.e., an image forming process, of forming an image based on the page data 820 to the sheet fed from the sheet support portion by the image forming engine 50.

As illustrated in FIG. 9B, the printing process includes an imaging process in Step S311 of forming a bitmap image, i.e., an output image data, by rendering the image data 821 (input image data) of each page described in a PDL format. Here, an orientation of the bitmap image is determined by using a sheet orientation in print sheet information determined by a method described later. The imaging process includes an image rotating process of rotating the orientation of the bitmap image from the sheet orientation 816 of the PDL data 800 to a sheet orientation stored in the storage portion. The bitmap image generated by the imaging process is transmitted to the image forming engine 50 as a video signal and is used for modulation of scanning light of the exposure unit 3 in Step S312. Still further, settings for conditions for functions provided in the image forming apparatus 101, e.g., a temperature condition of the fixing unit corresponding to the sheet type 817, is changed in the printing process based on the sheet attribute information stored in the attribute data 811 of the PDL data 800 and/or the EEPROM 111. If printing for all pages and all number of copies specified by the PDL data 800 has finished, i.e., Yes in Step S313, the printing process is ended.

Meanwhile, in a case where the result of the sheet-support-portion conformity determination process for all the sheet support portions to be retrieved is NG (non-conformable), i.e., Yes in Step S304, the CPU 107 displays on the display 103 that there is no sheet suitable for printing in Step S308. Then, the CPU 107 stands by until when the sheet attribute information for any sheet support portion is changed, and in a case where the CPU 107 detects that the sheet attribute information has been changed, i.e., Yes in Step S309, the CPU 107 executes listing of the target sheet support portions to be retrieved and the sheet-support-portion conformity determination process again. It is noted that the CPU 107 judges that the sheet has been replaced by the user and the sheet attribute information has been changed if the detection signal of the sheet detection sensor 56 is changed, i.e., Yes in Step S202 in FIG. 5.

Figure 10:
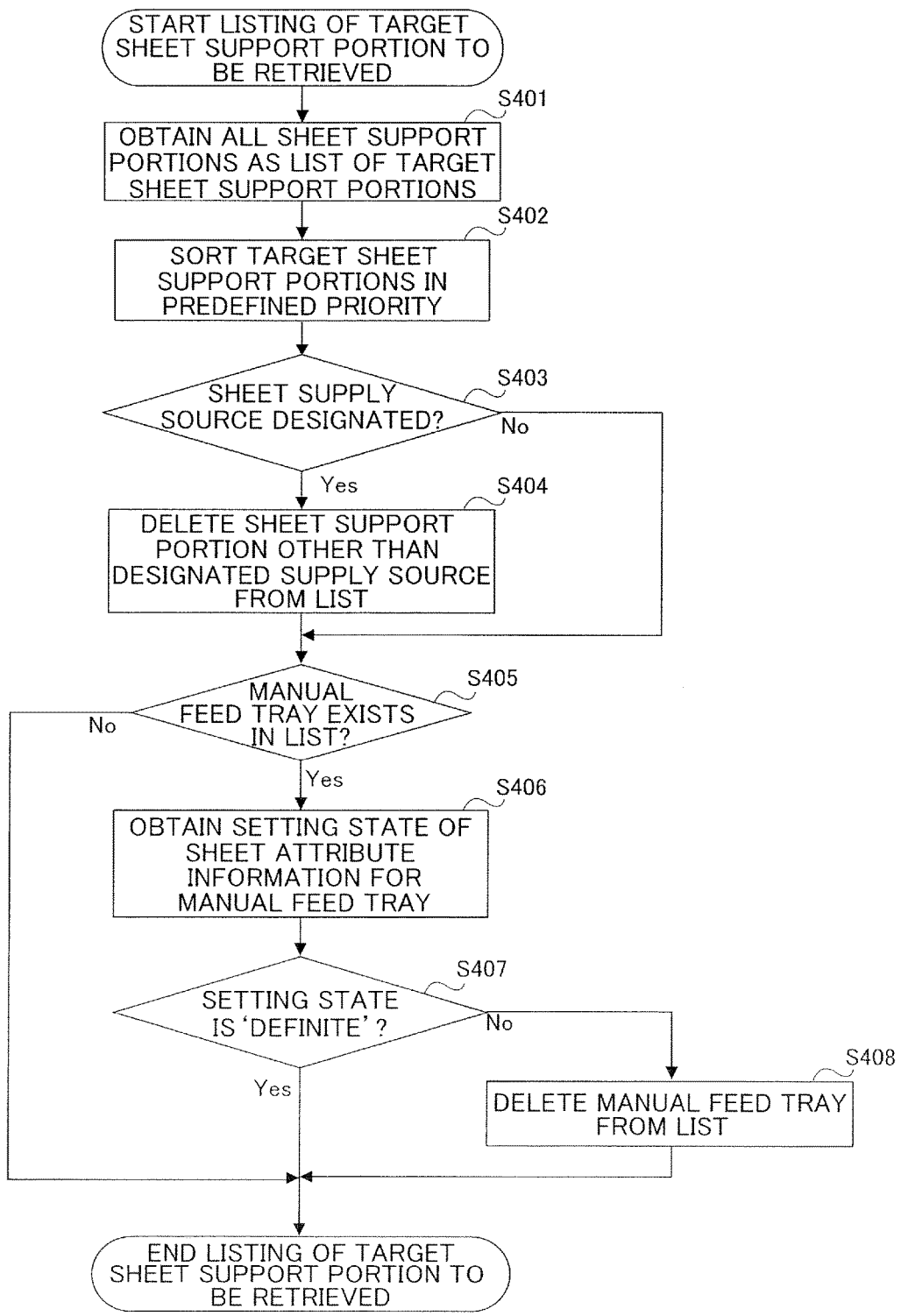
FIG. 10 is a flowchart illustrating a procedure of preparing a list of a sheet support portion to be retrieved as a sheet supply source.

A procedure of listing the target sheet support portions to be retrieved in Step S303 in FIG. 9A in the PDL execution process described above will be described along a flowchart illustrated in FIG. 10. At first, the CPU 107 obtains a list of all of the sheet support portions provided in the image forming apparatus 101 to make the list of the sheet support portions to be retrieved in Step S401. Next, the CPU 107 sorts the obtained list of the sheet support portions in accordance with the predefined priority levels in Step S402. For instance, the priority level is set such that the sheet feed cassette 51 is higher than the manual feed tray 52, and such that the closer to the image forming engine 50, the higher the priority level among the cassettes. Next, the CPU 107 determines whether the information of the sheet supply source exists in the analysis result of the PDL data 800 and in a case where the sheet supply source is specified, i.e., Yes in Step S403, the display 103 deletes the sheet support portions other than the specified sheet supply source from the list of the sheet support portions to be retrieved in Step S404.

The CPU 107 determines whether the manual feed tray 52 is included in the list of the target sheet support portions to be retrieved in Step S405. If the manual feed tray 52 is not included in the list, i.e., No in Step S405, contents of the list are confirmed at that moment, and the CPU 107 ends the procedure of listing. In a case where the manual feed tray 52 is included, i.e., Yes in Step S405, the CPU 107 refers to the EEPROM 111 to obtain a value of a 'setting state of sheet attribute information' related to the manual feed tray 52 in Step S406. In a case where the 'setting state of sheet attribute information' is 'DEFINITE', i.e., Yes in Step S407, the CPU 107 confirms contents of the list of the target sheet support portions to be retrieved at that moment. Meanwhile, in a case where the 'setting state of sheet attribute information' is 'INDEFINITE', i.e., No in Step S407, the CPU 107 deletes the manual feed tray 52 from the list of the sheet support portions to be retrieved in Step 5408 and ends the procedure of listing.

In succession, procedure for executing the sheet-support-portion conformity determination process in Step S305 in FIG. 9A will be described along a flowchart in FIG. 11. It is noted that this conformity determination process is common with a conformity determination process executed in executing the image forming job other than the PDL job such as a copying job.

At first, the CPU 107 sets a variable representing a determination result of the sheet-support-portion conformity determination process as 'NG' to initialize the process in Step S501 and initializes 'printing sheet attribute information' for use in the printing process in Step S502. Here, the printing sheet attribute information refers to attribute information of the sheet recognized by the CPU 107 as an object of the printing process and is temporarily held in the storage portion such as the RAM 113 until the image forming job is finished. Next, the CPU 107 obtains the sheet attribute information stored in the EEPROM 111 related to the sheet support portion specified as a target of retrieval as 'sheet-support-portion sheet attribute information' (referred to 'registered sheet attribute information' in FIG. 11) in Step S503.

The CPU 107 also obtains the sheet attribute information included in the image forming job as 'job sheet attribute information' in Step S504. In the case of the PDL job, the job sheet attribute information includes the sheet size 815, the sheet orientation 816 and the sheet type 817, which are obtained by analyzing the PDL data 800. It is noted that if the sheet orientation 816 is not specified, the job sheet attribute information is complemented based on the sheet size 815. For instance, in a case where the both of the long and short edge feeds are supported by the image forming apparatus 101, the completion is made by the short edge feed orientation, which is advantageous in terms of printing speed. In a case where the sheet size 815 is supported only by one sheet orientation, the completion is made by the supported sheet orientation.

Next, the CPU 107 determines whether the job of this time is an object of the operation of the driver setting priority function, i.e., whether it is a PDL job, in Step S505. In a case where it is not the PDL job, it is unable to apply the driver setting priority function, so that the CPU 107 continues the process and assigns the value of the sheet-support-portion sheet attribute information to the printing sheet attribute information in Step S506. In a case where it is the PDL job, the CPU 107 obtains the setting information whether the driver setting priority function is valid or not from the EEPROM 111 in Step S507. If the driver setting priority function is invalid, the CPU 107 assigns the value of the sheet-support-portion sheet attribute information to the printing sheet attribute information in Step S506. If the driver setting priority function is valid, the CPU 107 turns to the driver setting priority mode and executes the setting process of the printing sheet attribute information in Step S508. In the driver setting priority mode, the contents of the job sheet attribute information is set as the printing sheet attribute information with higher priority than the sheet-support-portion sheet attribute information except of a specific case described later.

Next, the CPU 107 determines whether the sheet size in the printing sheet attribute information is consistent with the sheet size in the job sheet attribute information and whether the sheet type in the printing sheet attribute information is consistent with the sheet type of the job sheet attribute information in Steps S509 and S510. It is noted that in a case where no sheet type is set in the job sheet attribute information, the determination of Step S510 may be omitted. Still further, instead of omitting the determination, it may be arranged such that the same effect with a case where it is determined to be 'consistent' in Step S510 is brought about by determining whether the sheet-support-portion sheet attribute information is included in a group of certain predetermined sheet types.

In a case where at least one of determination results of Steps S509 and S510 is 'inconsistent', the CPU 107 judges that it is impossible to execute the image forming job by using this sheet support portion and finishes the process by returning the initial value of 'NG' as a determination result. Meanwhile, in a case where both of these determination results are 'consistent', the CPU 107 executes a function combination conformity determination process for determining whether the printing sheet attribute information can be combined with the function of the image forming apparatus 101 specified by the image forming job in Step S511. It is noted that contents of the function combination conformity determination process will be described later.

If a result of the function combination conformity determination process is OK, i.e., in a case where the printing sheet attribute information conforms to conditions for applying the specified function, the CPU 107 determines that the image forming operation can be started on the sheet to be fed from this sheet support portion. In this case, the CPU 107 finishes the process by returning 'OK' as a result of the sheet-support-portion conformity determination process in Step S513. Meanwhile, if a result of the function combination conformity determination process is NG, the CPU 107 judges that it is impossible to execute the image forming job using this sheet support portion and finishes the process by returning the initial value of 'NG' as a determination result.

Operation in Driver Setting Priority Mode

Here, features of the operation of the image forming apparatus 101 in the driver setting priority mode will be described. As described above, in the normal mode, the CPU 107 determines whether the sheet size and the sheet type are consistent between the sheet-support-portion sheet attribute information stored in the EEPROM 111 and the job sheet attribute information extracted from the PDL data, since the sheet-support-portion sheet attribute information is used as the printing sheet attribute information. If both of the sheet size and sheet type are consistent, the function combination conformity determination process is executed. Accordingly, the printing process is carried out only if, that is, on the necessary condition that, the sheet attribute information included in the PDL job matches the sheet attribute information stored in the storage portion in the normal mode.

In contrast, in the driver setting priority mode, the job sheet attribute information extracted from the PDL data is used in principle as the printing sheet attribute information. Therefore, in determining consistency/inconsistency of the sheet size and sheet type between the printing sheet attribute information and the job sheet attribute information in the sheet-support-portion conformity determination process, they are always determined to be 'consistent'. That is, in the driver setting priority mode, the printing process is carried out and an image is formed on a sheet even if the sheet attribute information included in the PDL job is inconsistent with the sheet attribute information stored in the storage portion, i.e., the EEPROM 111. However, the printing process is not always, as described above, carried out forcibly in the driver setting priority mode, and it is required to conform to other determination conditions such as the function combination conformity determination process, i.e., Step S511.

By the way, in the driver setting priority mode, such a case is conceivable that a sheet orientation included in the PDL job is different from a sheet orientation stored in the EEPROM 111. This case corresponds to a case where the user has stacked the sheet in an orientation different from the sheet orientation inputted into the driver software, for example. In such case, an image rotated by 90 degrees with respect to the actual sheet orientation is outputted, thus the user fails to obtain a desirable printing result because the outputted image is lacking end portions in the long edge direction, for example. Such case is likely to occur when there is a sheet which can be placed on a different direction on the sheet support portion like the manual feed tray 52 as illustrated in FIG. 2C. In the case of the manual feed tray 52, a sheet can be stacked even in a condition in which either one of the long and short edges is aligned with the width direction as long as the sheet is within a movable range of the side guides 53 and 53.

Setting Printing Sheet Attribute Information

Based on insights described above, in the present embodiment, the sheet orientation stored in the EEPROM 111 rather than the sheet orientation included in the PDL job is used as the sheet orientation of the printing sheet attribute information in the driver setting priority mode. The setting process of the printing sheet attribute information, i.e., Step S508 in FIG. 11, in the driver setting priority mode will be described below with reference to a flowchart illustrated in FIG. 12.

Before this setting process is started, the sheet size, the sheet orientation, and the sheet type of the printing sheet attribute information are all initialized. In starting the setting process, the CPU 107 sets up values extracted from the PDL data as the sheet size and the sheet type of the printing sheet attribute information in Steps S601 and S602. Meanwhile, as for the sheet orientation of the printing sheet attribute information, the CPU 107 refers to the sheet attribute information stored in the EEPROM 111 to set up the sheet orientation of the sheet support portion that is the target of the sheet-support-portion conformity determination process in Step S603.

Figure 13A:
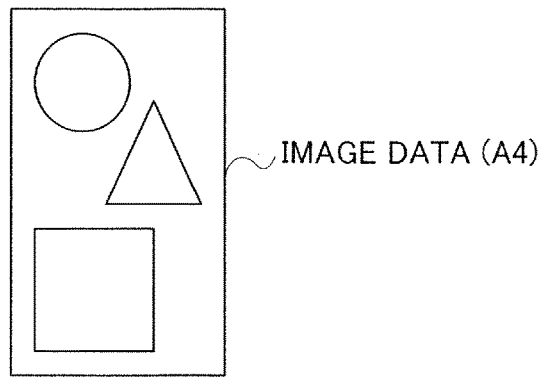
FIG. 13A is an image illustrating one exemplary image data included in the PDL job.
Figure 13B:
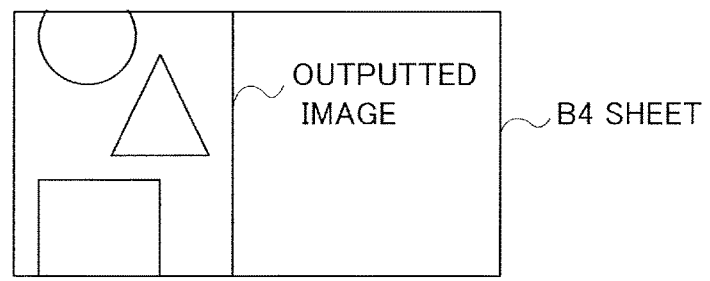
FIG. 13B is an image as a result of outputting the image data through a comparative configuration.
Figure 13C:
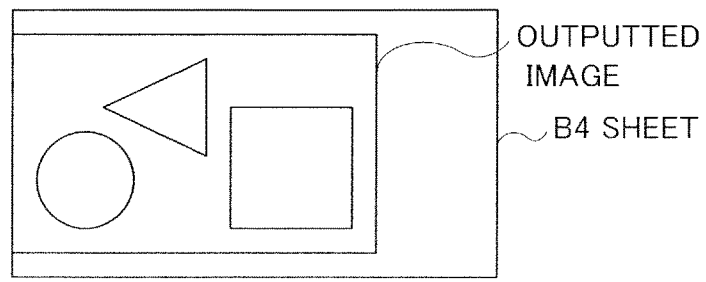
FIG. 13C is an image as a result of outputting the image data through the configuration of the first embodiment.

An operation of the image forming apparatus 101 based on such setting will be described with reference FIGS. 13A through 13C. Here, FIG. 13A represents image data to be printed. FIGS. 13B and 13C illustrate printed results obtained by executing the PDL job including the image data in FIG. 13A by a comparative image forming apparatus (FIG. 13B) and the image forming apparatus of the present embodiment with the driver setting priority function valid (FIG. 13C). The comparative image forming apparatus is different from the present embodiment in that the information extracted from the PDL data, including the sheet orientation, is used as the printing sheet attribute information in the driver setting priority mode, while having similar configurations with the present embodiment other than that point. Suppose that A4 is specified as the sheet size and the short edge feed orientation is specified as the sheet orientation in the PDL job. Meanwhile, suppose that B4 size sheet is placed on the manual feed tray 52 with the long edge feed orientation.

In the comparative configuration, 'A4, short edge feed orientation' are set as the sheet size and the sheet orientation of the printing sheet attribute information. Due to that, an image of the short edge feed orientation is formed on the sheet which is actually placed with the long edge feed orientation, and end portions in the long edge direction is missed as illustrated in FIG. 13B. In contrast, according to the present embodiment, 'A4, long edge feed orientation' are set as the sheet size and the sheet orientation of the printing sheet attribute information. Due to that, an image rotating process is executed in the printing process and an image that is arranged along the actual sheet orientation is formed. That is, an image whose long edge direction is coincident with the long edge direction of the actual sheet is formed, thus preventing the image from being partially missed.

It is noted that while the sheet having the size different from the sheet size specified by the PDL job is placed on the examples illustrated in FIGS. 13B and 13C, the similar result is obtained even in a case where a sheet of the size equal to that of the specified sheet size is placed. That is, while the end portions in the long edge direction of the image will be missed in the comparative configuration, an image fitting with the actual sheet is outputted by the present embodiment. Even if a sheet which is smaller than the specified sheet size is used in the present embodiment, it is possible to suppress an area missing the image as compared to the comparative configuration.

Thus, according to the setting method of the printing sheet attribute information of the present embodiment, an image which has been rotated in accordance with the actual sheet is outputted if the sheet orientation specified by the PDL job is not consistent with the actual sheet orientation. Still further, an image just as the image data included in the PDL job is outputted if the sheet orientation specified by the PDL job is consistent with the actual sheet orientation. With this operation, i.e., a first operation, of outputting the image by changing the orientation of the image actually formed on the sheet from the sheet orientation included in the image forming job to the sheet orientation stored in the storage portion (Steps S307 and S603), defects in the outputted image are prevented or reduced, thereby a printing result as expected by the user is obtained.

Determining Function Combination Conformity

Figure 14:
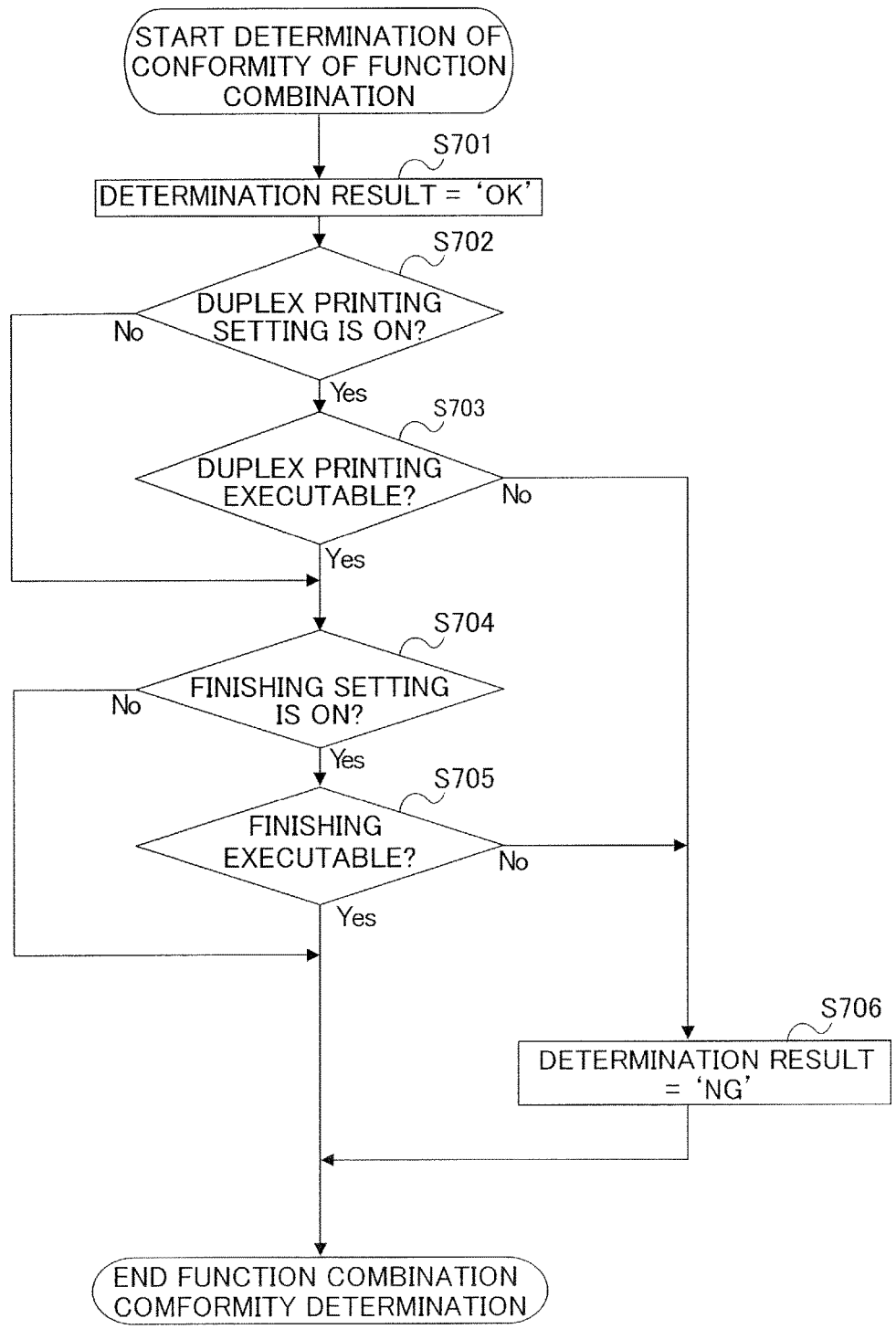
FIG. 14 is a flowchart illustrating a procedure of a function combination conformity determination process of determining whether a sheet attribute can be combined with a function of the image forming apparatus.

Finally, a function combination conformity determination process, i.e., Step S513 in FIG. 11, executed in the sheet-support-portion conformity determination process will be described with reference to a flowchart in FIG. 14. At first, the CPU 107 initializes a variable representing a determination result of this determination process as 'OK' in Step S701. Next, the CPU 107 determines whether a setting which instructs duplex printing is included in the image forming job in Step S702. If the duplex printing is specified, the CPU 107 determines whether the printing sheet attribute information is suitable for the duplex printing in Step S703. Specifically, the determination includes a judgment whether a length in a sheet conveyance direction, i.e., a sheet length, is fully longer than a distance between the conveyance rollers disposed in the reverse conveyance portion 8 of the image forming apparatus 101 (see FIG. 2B). This is because there is a possibility of causing conveyance abnormality such as jamming by failing to pass the sheet between the conveyance rollers if the sheet length is shorter than the distance between the conveyance rollers.

Next, the CPU 107 determines whether the image forming job includes finishing setting which instructs a post-processing by the finisher unit 109 in Step S704. The post-processing of the finisher unit 109 refers to a punching process of punching a through hole, a binding process or stapling process implemented by stapler, or the like. If the finishing setting is included in the image forming job, the CPU 107 determines whether the printing sheet attribute information conforms to conditions for a processing content specified by the finishing setting in Step S705. For instance, suppose a case where the finisher unit 109 is configured to punch a sheet only to the trailing end portion thereof in the sheet conveyance direction, and punching along one long edge of an A4 sheet is specified as the finishing setting. In this case, if the sheet orientation of the printing sheet attribute information is set in an orientation other than the 'short edge feed orientation', it is determined to be nonconforming (mismatched) because there is a possibility that the punching cannot be appropriately carried out. The same applies also to stapling and there is a case where the sheet orientation of the printing sheet attribute information should be the 'short edge feed orientation' in a case where stapling along one long edge of the A4 sheet is carried out.

If the results of the determination related to the duplex printing in Step S703 and the determination related to the finishing setting in Step S705 are both conformable, the CPU 107 returns 'OK' as a determination result of the function combination conformity determination process and finishes the process. Meanwhile, if either one of the determination results is non-conformable, the CPU 107 returns 'NG' as the determination result and finishes the process in Step S706.

Figure 12:
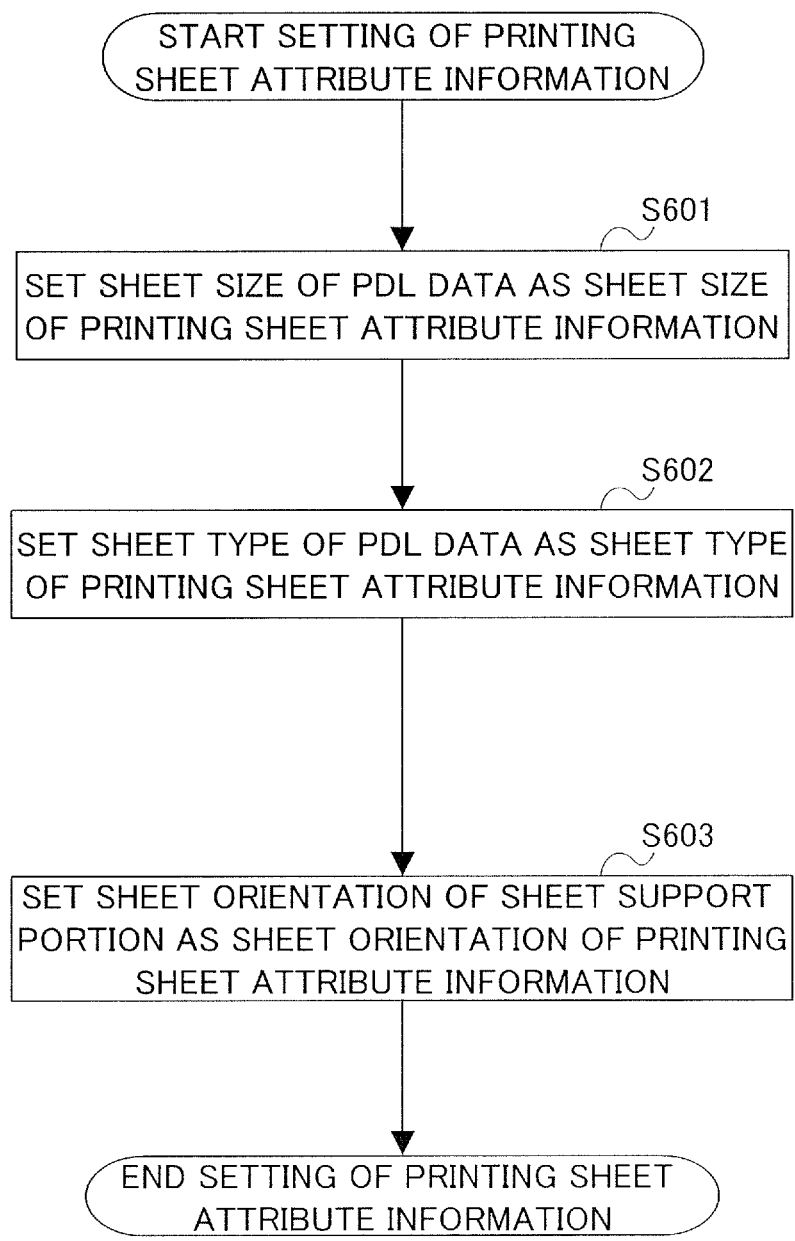
FIG. 12 is a flowchart illustrating a procedure of a setting process of printing sheet attribute information executed in a driver setting priority mode in the image forming apparatus of the first embodiment.

Here, in a case where the PDL job is executed in the driver setting priority mode, the printing sheet attribute information that is determined along the flowchart described in FIG. 12 is used for the function combination conformity determination process. Accordingly, when the image rotating process is executed in executing the printing process, it is determined whether the duplex printing and finishing can be carried out by using the sheet orientation after the rotation. Therefore, the execution of the printing process is stopped in a case where the sheet orientation after the rotation is non-conformable to the duplex printing even though duplex printing were performed in accordance to the sheet size and the sheet orientation specified by the PDL job. This arrangement makes it possible to increase accuracy of the function combination conformity determination process and to avoid trouble such as abnormal conveyance.

MODIFIED EXAMPLE

It is noted that the duplex printing and finishing have been exemplified as the functions determined in the function combination conformity determination process, a processing step for determining conformability to another function mounted in the image forming apparatus.

Figure 11:
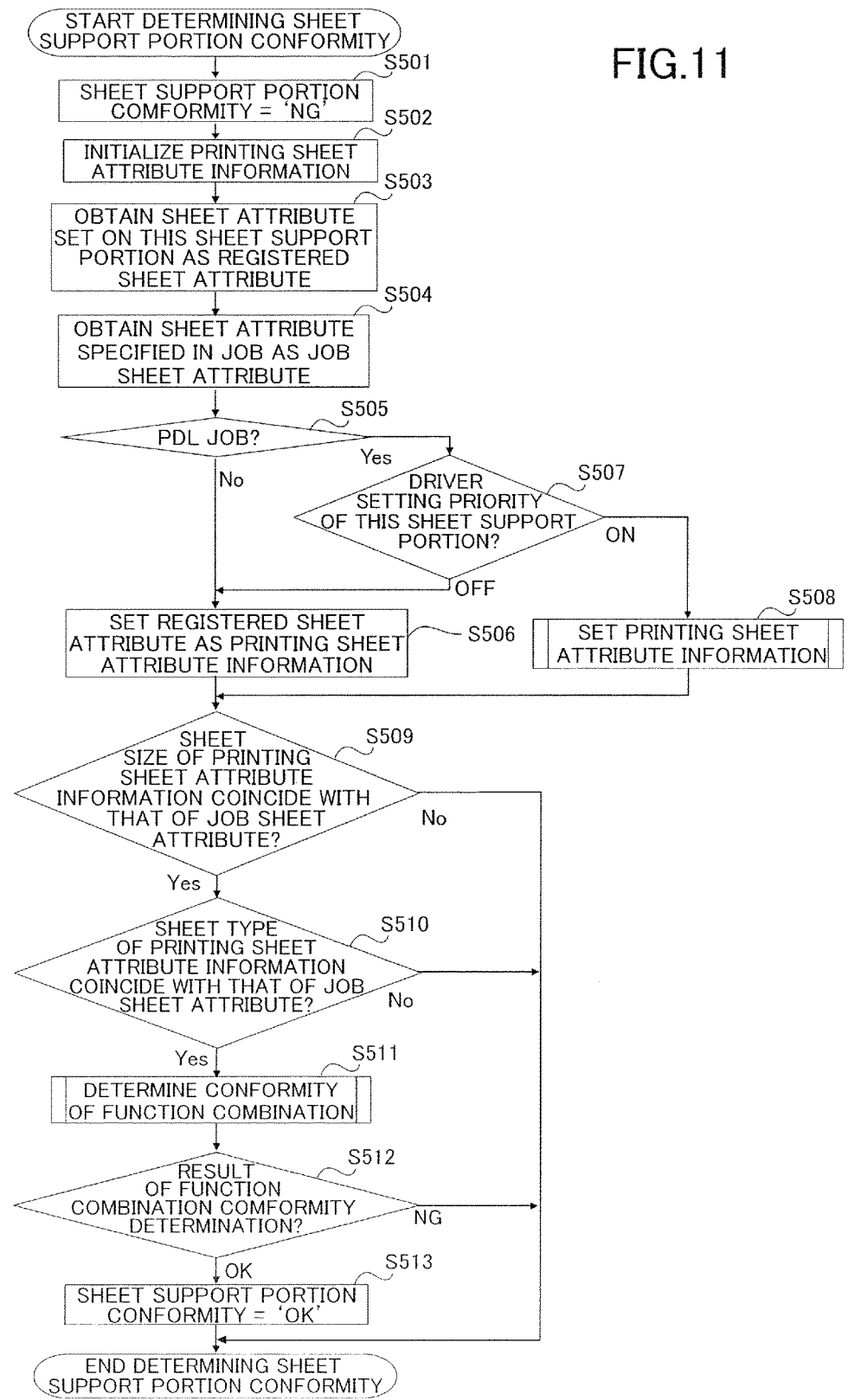
FIG. 11 is a flowchart illustrating a procedure of a conformity determination process for determining whether the target sheet support portion is conformable as a sheet supply source.

Still further, according to the present embodiment, the printing process is executed only when the sheet size and the sheet orientation in the PDL job are consistent with the values stored in the EEPROM 111 in the case where the PDL job is executed in the normal mode in Steps S509 and S510 (see FIG. 11). However, it is possible to arrange such that a condition in which the sheet size is coincident and the sheet orientation is different in the normal mode is included in the case where sheet attribute information of the PDL data is coincident with the sheet attribute information stored in the EEPROM 111. That is, in the case described above, it may be arranged such that an image rotated in accordance to the actual sheet orientation is outputted in the normal mode.

Second Embodiment

Next, an image forming apparatus of a second embodiment in the present disclosure and its control method will be described. According to the present embodiment, an operation in a case where a sheet size of a sheet supported on the sheet support portion is set as 'free-size' is different from that of the first embodiment. Other elements in the present embodiment in common with that of the first embodiment will be denoted by the same reference numerals with the first embodiment and their description will be omitted.

Figure 15:
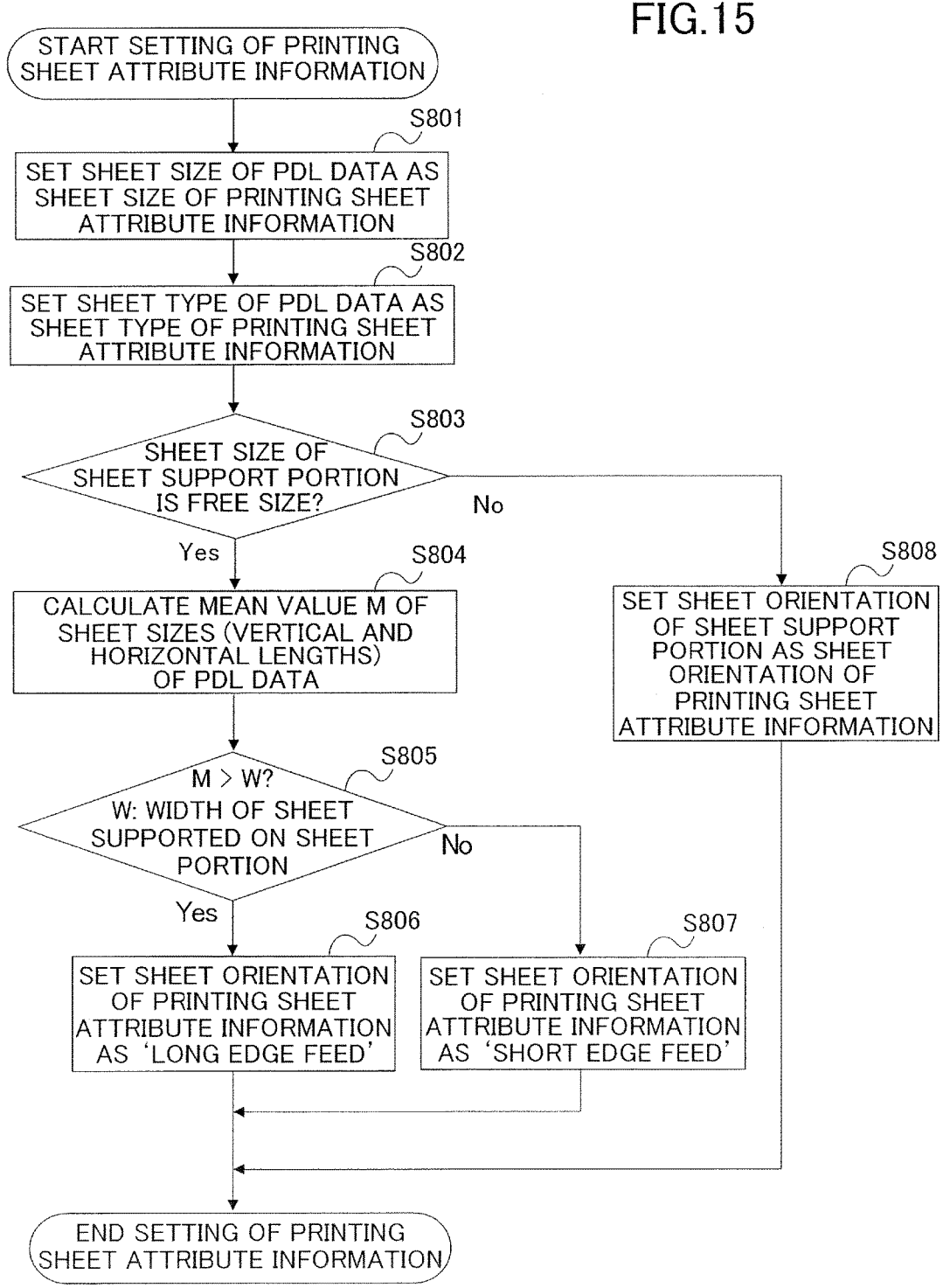
FIG. 15 is a flowchart illustrating a procedure of a printing sheet attribute information setting process executed in the driver setting priority mode in an image forming apparatus of a second embodiment.

A setting process of the printing sheet attribute information in the driver setting priority mode will be described along a flowchart illustrated in FIG. 15. It is noted that a starting condition of the setting process of the printing sheet attribute information of the present embodiment is equal to that of the first embodiment. That is, the following setting process is executed if the image forming job is the PDL job, i.e., Yes in Step S505, and if the driver setting priority function is valid, i.e., Yes in Step S506, in the sheet-support-portion conformity determination process (see FIG. 11).

At first, values extracted from the PDL data are set as a sheet size and a sheet type of the printing sheet attribute information in Steps S801 and S802. Next, the CPU 107 refers to the sheet attribute information stored in the EEPROM 111 to determine whether the sheet size is determined as 'free-size' regarding the sheet support portion which is a target of the sheet-support-portion conformity determination process in Step S803.

If the sheet size is 'free-size', the CPU 107 determines the sheet orientation of the printing sheet attribute information by using the sheet size included in the PDL data and information related to size of a sheet detected the size detection portion disposed on the sheet support portion. Specifically, the CPU 107 calculates a median M of vertical and horizontal lengths (long and short edges) of the sheet size, i.e., a mean value of the long and short edge lengths, from the sheet size in the PDL data in Step S804. Then, the CPU 107 compares the median M with a sheet width W detected by the guide width sensors 54 and 54 in Step S805.

If the median M is greater than the sheet width W, i.e., M>W, the CPU 107 judges that the sheet is placed on the sheet support portion with the long edge feed orientation and sets the sheet orientation of the printing sheet attribute information as the long edge feed orientation in Step S806. If the median M is equal to or smaller than the sheet width W, i.e., M≤W, on the other hand, the CPU 107 judges that the sheet is placed on the sheet support portion with the short edge feed orientation and sets the sheet orientation of the printing sheet attribute information as the short edge feed orientation in Step S807. In other words, the CPU 107 calculates a threshold value based on the sheet size of the PDL data and judges that (i) a sheet width direction corresponding to a first direction is the long edge direction if the detected sheet width is greater than the threshold value and that (ii) the sheet width direction is the short edge direction and the sheet feed direction corresponding to a second direction orthogonal to the first direction is the long edge direction if the sheet width is less than the threshold value. Here, the length of the threshold value is set at the median M between the short and long edge lengths of the image data in the present embodiment. That is, it is possible to execute the second operation of changing the orientation of the output image depending on the size of the sheet detected by the size detection portion, and such second operation, i.e., Steps S307 and S804 through S807 is executed in the case where the sheet size is the 'free-size', i.e., where an input-free setting is valid (input-free mode is enabled).

In a case where the sheet size is not 'free-size' on the other hand, i.e., No in Step S803, the sheet orientation of the sheet-support-portion sheet attribute information is determined as a setting value of the sheet orientation of the printing sheet attribute information in Step S808 similarly to the first embodiment. In this case, a first operation in Steps S307 and S808 of outputting an image is executed by changing an orientation of the image to be actually formed on the sheet with respect to the sheet orientation included in the image forming job in accordance with the sheet orientation stored in the storage portion.

Figure 16A:
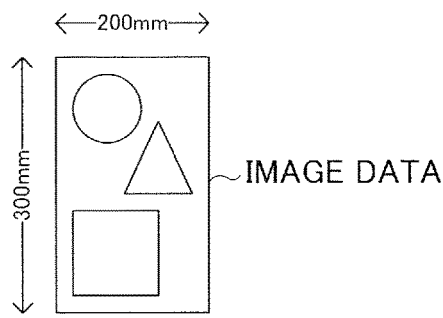
FIG. 16A is an image illustrating one exemplary image data included in a PDL job.
Figure 16B:
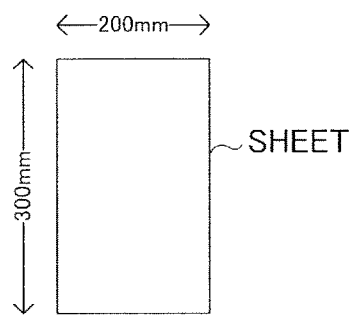
FIG. 16B is a schematic diagram illustrating a size of a sheet placed on a manual feed tray.
Figure 16C:
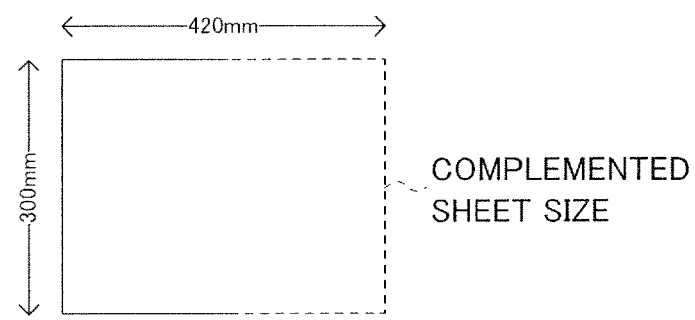
FIG. 16C is a conceptual diagram representing a sheet size stored in an EEPROM in a case where the sheet is placed in a short edge feed orientation in a free-size mode.
Figure 16D:
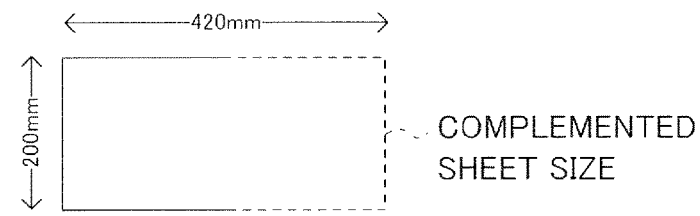
FIG. 16D is a conceptual diagram representing a sheet size stored in the EEPROM in a case where the sheet is placed in a long edge feed orientation in the free-size mode.

An operation of the image forming apparatus 101 based on such setting will be described below with reference to FIGS. 16A through 16D. It is noted that, because the operation in a case where the sheet size is not 'free-size' is the same with that of the first embodiment, a description of such case will be omitted here. FIG. 16A represents image data to be printed, and FIG. 16B represents a sheet placed on the manual feed tray 52. FIGS. 16C and 16D represent sheet sizes set as the printing sheet attribute information when the sheet illustrated in FIG. 16B is placed on the manual feed tray 52 in a short edge feed orientation and in a long edge feed orientation, respectively. The sheet sizes are supposed to be 200 mm×300 mm which is equal to those of the image data.

As described above, the manual feed tray 52 is not provided with a configuration for accurately detecting a sheet length, i.e., a length in a sheet feed direction of the sheet placed on the manual feed tray 52. Due to that, in a case where the sheet size is the 'free-size', a sheet length in the sheet size stored in the EEPROM 111 is complemented as 420 mm, which is a maximum size supported by the image forming apparatus 101. Accordingly, in a case where the sheet illustrated in FIG. 16B is placed with the short edge feed orientation, the sheet length, which is actually 200 mm, is determined to be 420 mm as illustrated in FIG. 16C. Still further, in a case where the sheet is placed with the long edge feed orientation, the sheet length, which is actually 300 mm, is determined to be 420 mm as illustrated in FIG. 16D.

According to the present embodiment, the sheet orientation is determined by using the sheet width that can be detected by the guide width sensors 54 without depending on the complemented sheet length. In the case illustrated in FIG. 16A, the median M calculated from the sheet sizes of the PDL data is (200+300)/2=250 mm. If the sheet having the same size with that specified in the PDL job (FIG. 16B), is placed with the short edge feed orientation, the sheet width W detected by the guide width sensors 54 will be 300 mm. Accordingly, because a relationship of M≤W holds in this case, the sheet orientation is judged to be the short edge feed orientation, and the sheet orientation of the printing sheet attribute information is set to be short edge feed orientation. In a case where the sheet is placed on the manual feed tray 52 with the long edge feed orientation, the sheet width W detected by the guide width sensors 54 is 200 mm. Accordingly, because a relationship of M>W holds in this case, the sheet orientation is judged to be the long edge feed orientation, and the sheet orientation of the printing sheet attribute information is determined to be long edge feed orientation.

Then, in the printing process, the image rotating process is executed in the same manner with the first embodiment described above in the case where the sheet orientation included in the PDL job is different from the sheet orientation of the printing sheet attribute information. This arrangement makes it possible to form the image along an actual sheet orientation even in a case where the sheet illustrated in FIG. 16B is placed with an either orientation of the short edge feed orientation and the long edge feed orientation. Still further, even in a case where a sheet of size other than that illustrated in the drawing is placed, the image rotating process is executed as necessary in accordance to the sheet orientation estimated by using the sheet width detected by the guide width sensors 54 and 54. Accordingly, the arrangement of the present embodiment makes it possible to obtain a printing result as expected by the user even in the free-size mode.

Modified Example

While the embodiment described above has been configured such that the sheet width W, which is a length of one edge of a sheet detected by the size detection portion, is compared with the threshold of the median M, determination criteria are not limited to that. For instance, in a case where the detected sheet width W is longer than a long edge of the sheet size of the PDL job, i.e., in a case where a length in a first direction is longer than the length of the long edge of the sheet extracted from the image forming job, it is possible to avoid end portions of the image in the long edge direction from being cut by executing the printing process by determining the short edge feed orientation as the sheet orientation. Then, it is suitable to set the determination criteria such that the sheet orientation of the printing sheet attribute information becomes the short edge feed orientation at least in such a case. It is noted that the determination criteria of the present embodiment is one exemplary determination criteria meeting within such condition. Still further, when comparing the sizes with the threshold value, it is arbitrary how the sheet orientation is determined if a detected sheet size is equal to the threshold value.

Third Embodiment

Next, an image forming apparatus and its control method of a third embodiment of the present disclosure will be described. The present embodiment is different from the first embodiment described above in that the sheet orientation of the printing sheet attribute information is determined by considering a comparison result of the sheet size included in the PDL job and the sheet size stored in the EEPROM 111. The other configurations of the present embodiment are the same with that of the first embodiment, so elements common with those of the first embodiment will be denoted by same reference numerals and their description will be omitted.

Figure 17:
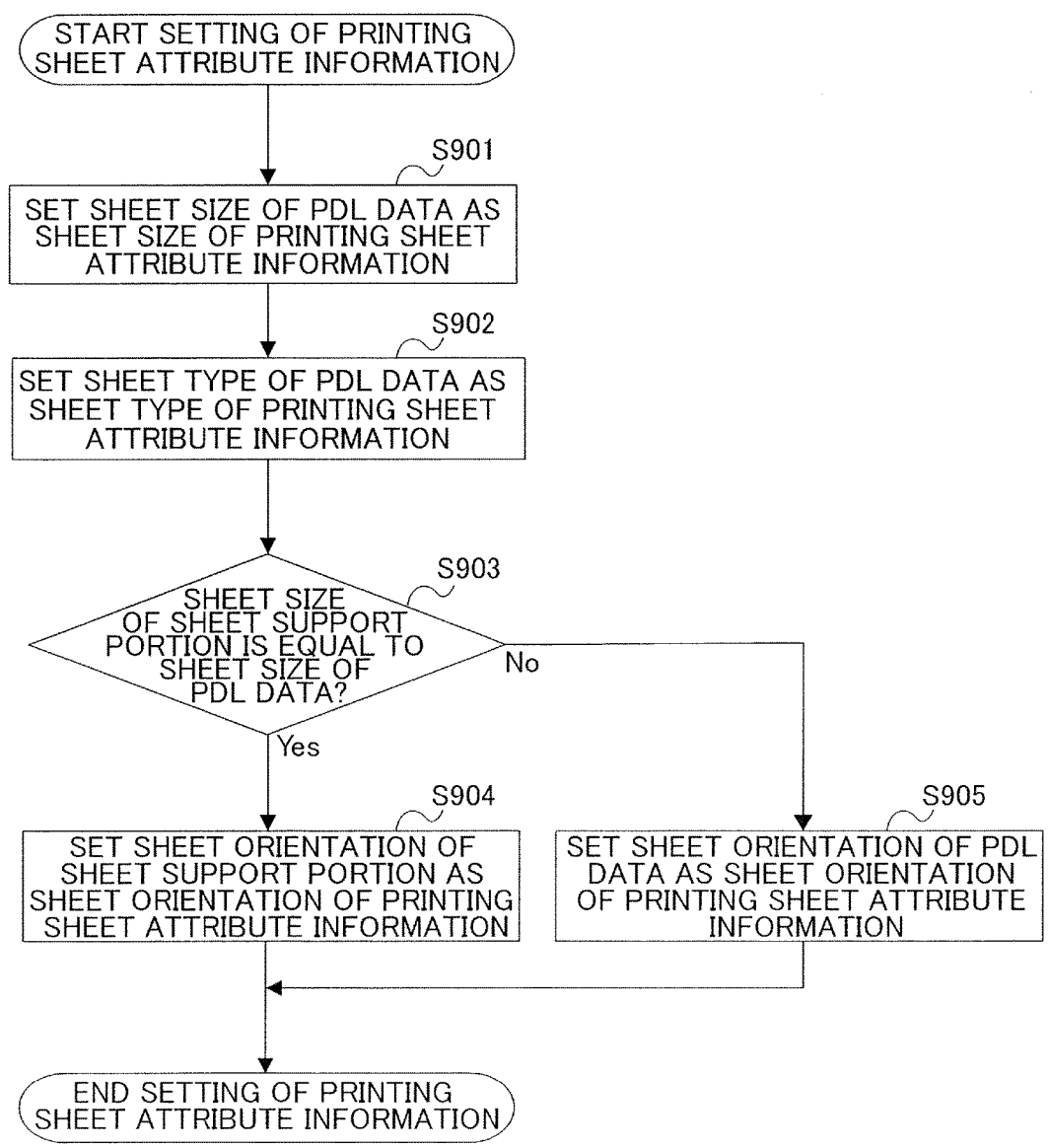
FIG. 17 is a flowchart illustrating a procedure of a printing sheet attribute information setting process executed in the driver setting priority mode in an image forming apparatus of a third embodiment.

A method for setting the printing sheet attribute information of the present embodiment will be described below with reference to FIG. 17. It is noted that this setting process is executed as a part of the sheet-support-portion conformity determination process in executing the PDL job in the driver setting priority mode, similarly to the first and second embodiments described above.

At first, the CPU 107 sets values extracted from the PDL data as a sheet size and a sheet type of the printing sheet attribute information in Steps S901 and S902. Next, the CPU 107 determines whether the sheet size extracted from the PDL data coincides with a sheet size stored in the EEPROM 111 in Step S903. If these sheet sizes are consistent, a value of a sheet orientation stored in the EEPROM 111 is set as a sheet orientation of the printing sheet attribute information in Step S904. If the sheet sizes do not coincide on the other hand, a value of a sheet orientation extracted from the PDL data is set as a sheet orientation of the printing sheet attribute information in Step S905.

An operation of the image forming apparatus 101 based on such setting will be described below. Suppose a case where the PDL job is inputted to the image forming apparatus 101 and where the sheet orientation included in the PDL job is different from a sheet orientation of a sheet placed on the manual feed tray 52 in the condition in which the driver setting priority function is enabled. In this case, according to the configuration of the first embodiment, the value of the sheet orientation stored in the EEPROM 111 is used as the sheet orientation of the printing sheet attribute information regardless whether or not the information related to the sheet sizes are consistent. In contrast, according to the configuration of the present embodiment, the value of the sheet orientation stored in the EEPROM 111 is used as the sheet orientation of the printing sheet attribute information only in the case where the sheet size included in the PDL data coincides with the sheet size stored in the EEPROM 111.

Accordingly, if the sheet sizes are consistent between the sheet attribute information of the PDL job and the sheet attribute information stored in the storage portion, the image forming apparatus of the present embodiment executes the first operation similarly to the first embodiment. That is, if the sheet orientation included in the PDL data is different from the sheet orientation stored in the sheet orientation at this time, the image rotating process is executed in the printing process and an image rotated by 90 degrees is outputted. Still further, if the sheet orientation included in the PDL job is equal to the sheet orientation stored in the storage portion, an image is outputted as the image data included in the PDL job.

In a case where the sheet sizes are not consistent between the sheet attribute information of the PDL job and the sheet attribute information stored in the storage portion, the printing process is executed in accordance to the sheet orientation included in the PDL data as a third operation. For instance, a PDL job specifying a sheet of 'A4, short edge feed orientation' is inputted and a sheet of 'B4, long edge feed orientation' is placed on the manual feed tray 52, an image according to the long edge feed orientation is outputted as described above in the first embodiment (see FIG. 13C). Meanwhile, an image according to the short edge feed orientation is outputted in a similar case in the present embodiment (see FIG. 13B).

Here, there is a case where the orientation of the sheet placed on the sheet support portion is represented as an orientation based on a user accessing direction, e.g., vertical/horizontal orientations, besides the orientation based on the sheet feed direction. Therefore, there is a possibility that the user does not recognize inconsistency of the sheet orientations in a case where the sheet sizes are consistent and only the sheet orientations are inconsistent between the sheet attribute information of the PDL job and the sheet attribute information stored in the storage portion. On the other hand, it is considered that the user commands execution of a printing process upon probably recognizing that sheet attribute information is inconsistent in a case where both of sheet sizes and sheet orientations are inconsistent, as compared to the abovementioned case.

According to the configuration of the present embodiment, in a case where sheet orientations are inconsistent between the information stored in the PDL job and that stored in the storage portion, the image rotating process is executed only if sheet sizes are consistent and no image rotating process is executed if the sheet sizes are inconsistent. This arrangement makes it possible to realize a configuration by which an image rotated by 90 degrees is outputted only in a case where a possibility that the user has placed the sheet in an erroneous orientation is high.

Modified Example

It is noted that the condition that determines the sheet size included in the PDL job and the sheet size stored in the EEPROM 111 as 'consistent' is not limited to be numerically strict consistency, and an appropriate allowable range may be provided. For instance, in a case where lengths of long and short edges are numerically inputted as user defined size in the EEPROM 111, the setting may be arranged so as to determine as 'consistent' even if those lengths are different from sheet sizes specified by the PDL job if the difference is as small as a few millimeters.

Other Embodiments

While the first through third embodiments have been described such that the image rotating process is executed within the control unit 102 mounted in the image forming apparatus 101, it may be arranged such that the image rotating process is executed by the host computer. For instance, in a configuration in which the host computer executes a rendering process of converting image data described in a PDL format into a raster form supported by the image forming engine, the image rotating process may be executed in parallel with the rendering. In short, regardless whether the controller exists inside or outside of the image forming apparatus 101, such configuration including the host computer and the image forming apparatus may be adopted, that an image rotated as necessary with respect to input image data is outputted in an image forming system. In other words, the controller mounted in either one of host computer and the image forming apparatus may process image data by a processing method including an obtaining step of obtaining necessary information, a setting step of setting an orientation of an image to be printed based on the obtained information, and a generating step of generating an output image data to be printed.

Here, the information obtained in the obtaining step includes sheet attribute information stored in the storage portion, information indicating whether the driver setting priority function is enabled or disabled, and input image data and sheet orientation inputted to the driver software. Steps 5503 through 5507 in the sheet-support-portion conformity determination process in the above embodiment corresponds the obtaining step. Step 5603 in the first embodiment and steps 5803 through 5808 in the second embodiment, and Steps 5903 through S905 in the third embodiment are examples of the setting process. In the generating step, an output image data obtained by rotating the input image data inputted to the driver software as necessary in accordance to the sheet orientation of the printing sheet attribute information determined by the same standard with either one of the embodiments described above. According to the embodiment described above, Step S311 in the printing process corresponds to the generating step.

Still further, among the setting method of the printing sheet attribute information described in the first through third embodiments, it may be arranged such that two or more setting methods may be mounted in the image forming apparatus 101 and such that the user can select the setting method used in the driver setting priority mode in advance.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194939, filed on Sep. 30, 2016 which is hereby incorporated by reference wherein in its entirety.

What is claimed is:

1. An image forming apparatus comprising:
a sheet support portion configured to support a sheet;
an image forming portion configured to form an image on the sheet fed from the sheet support portion;
a storage portion configured to store information of a sheet size and a sheet orientation of the sheet supported on the sheet support portion; and
a controller comprising a processor and configured to execute, in a case where an image forming job is inputted, one of a plurality of modes including a first mode and a second mode,
wherein the first mode is a mode in which an image is formed on the sheet by the image forming portion only if a sheet size included in the image forming job is consistent with the sheet size stored in the storage portion, and the second mode is a mode in which an image is formed on the sheet by the image forming portion even if the sheet size included in the image forming job is inconsistent with the sheet size stored in the storage portion, and
wherein the controller is configured to execute, in the second mode, a first operation by which
an image corresponding to a sheet orientation included in the image forming job is formed on the sheet if the sheet orientation included in the image forming job is consistent with the sheet orientation stored in the storage portion, and
an image corresponding to the sheet orientation stored in the storage portion is formed on the sheet if the sheet orientation included in the image forming job is inconsistent with the sheet orientation stored in the storage portion.

2. The image forming apparatus according to claim 1, wherein in a case where the controller executes the first operation with the sheet orientation included in the image forming job being inconsistent with the sheet orientation stored in the storage portion,
the controller controls the image forming portion by using the sheet orientation stored in the storage portion such that a long edge direction of an image to be formed on the sheet coincides with a long edge direction of the sheet supported on the sheet support portion.

3. The image forming apparatus according to claim 1, further comprising a size detection portion configured to detect a size of the sheet supported on the sheet support portion,
wherein the controller is configured to execute, in the second mode, one of a plurality of operations including the first operation and a second operation, the second operation being an operation by which an orientation of an image to be formed on the sheet by the image forming portion is changed depending on the size detected by the size detection portion.

4. The image forming apparatus according to claim 3, wherein the storage portion is configured to store information indicating whether an input-free setting that allows to omit an input of the sheet size and the sheet orientation is enabled or disabled, and
wherein the controller is configured to execute the first operation in the second mode if the input-free setting is disabled and to execute the second operation in the second mode if the input-free setting is enabled.

5. An image forming apparatus comprising:
a sheet support portion configured to support a sheet;
a size detection portion configured to detect a size of the sheet supported by the sheet support portion;
an image forming portion configured to form an image on the sheet fed from the sheet support portion;
a storage portion configured to store information of a sheet size and a sheet orientation of the sheet supported on the sheet support portion, and information indicating whether an input-free setting that allows to omit an input of the sheet size and the sheet orientation is enabled or disabled; and
a controller comprising a processor and configured to execute, in a case where an image forming job is inputted, one of a plurality of modes including a first mode and a second mode,
wherein the first mode is a mode in which an image is formed on the sheet by the image forming portion only if a sheet size included in the image forming job is consistent with the sheet size stored in the storage portion, and the second mode is a mode in which an image is formed by the image forming portion even if the sheet size included in the image forming job is inconsistent with the sheet size stored in the storage portion, and
wherein in a case where the controller executes the second mode with the input-free setting enabled, the controller is configured to execute an operation by which an orientation of an image to be formed on the sheet by the image forming portion is changed depending on the size of the sheet detected by the size detection portion.

6. The image forming apparatus according to claim 5, wherein the size detection portion is configured to detect a length in a first direction of the sheet supported on the sheet support portion, and
wherein in a case where the controller executes the second mode with the input-free setting enabled, the controller controls the image forming portion such that
an image whose long edge direction coincides with the first direction is formed on the sheet if the length detected by the size detection portion is greater than a mean value of a long edge length and a short edge length of the sheet size included in the image forming job, and
an image whose long edge direction coincides with a second direction orthogonal to the first direction is formed on the sheet if the length detected by the size detection portion is less than the mean value.

7. The image forming apparatus according to claim 5, wherein the size detection portion is configured to detect a length in a first direction of the sheet supported on the sheet support portion, and
wherein in a case where the controller executes the second mode with the input-free setting enabled, the controller controls the image forming portion such that an image whose long edge direction coincides with the first direction is formed on the sheet if the length detected by the size detection portion is greater than a long edge length of the sheet size included in the image forming job.

8. The image forming apparatus according to claim 1, wherein in a case where the controller executes the second mode, the controller is configured to
execute the first operation if the sheet size included in the image forming job and the sheet size stored in the storage portion are consistent, and
execute a third operation, by which an image corresponding to the sheet orientation included in the image forming job is formed on the sheet, if the sheet size included in the image forming job and the sheet size stored in the storage portion are inconsistent.

9. The image forming apparatus according to claim 1, wherein the controller is configured to execute, in the second mode, a determination process of determining whether to start the image forming portion forming an image, the determination process being executed based on the sheet size included in the image forming job and a determined orientation determined from the sheet orientation included in the image forming job and the sheet orientation stored in the storage portion as an orientation of an image to be formed by the image forming portion.

10. The image forming apparatus according to claim 9, further comprising a sheet processing portion configured to process the sheet on which the image has been formed by the image forming portion,
wherein the controller is configured to determine in the determination process whether the sheet size and the determined orientation conform to a condition for a processing content to be performed by the sheet processing portion.

11. The image forming apparatus according to claim 9, wherein the image forming portion is capable of forming images on both surfaces of the sheet, and
wherein the controller is configured to determine in the determination process whether the sheet size and the determined orientation conform to a condition for forming images on both surfaces of the sheet by the image forming portion.

12. The image forming apparatus according to claim 5, wherein the sheet support portion is a manual feed tray configured such that the sheet can be manually placed.

13. A control method of an image forming system that includes an image forming apparatus and a host computer in which a driver software to generate an image forming job is installed, the image forming apparatus including: a sheet support portion configured to support a sheet; an image forming portion configured to form an image on the sheet fed from the sheet support portion; and a storage portion configured to store information of a sheet size and a sheet orientation of the sheet supported on the sheet support portion, wherein the image forming apparatus is configured to execute, in a case where the image forming apparatus receives the image forming job from the host computer, one of a plurality of modes including a first mode and a second mode, wherein the first mode is a mode in which an image is formed on the sheet by the image forming portion only if a sheet size included in the image forming job is consistent with the sheet size stored in the storage portion, and the second mode is a mode in which an image is formed on the sheet by the image forming portion even if the sheet size included in the image forming job is inconsistent with the sheet size stored in the storage portion, the control method comprising:
  obtaining information of the sheet stored in the storage portion, information of the mode to be executed by the image forming apparatus upon receiving the image forming job, and input image data and a sheet orientation inputted into the driver software;
  setting an orientation, with respect to the sheet to be fed from the sheet support portion, of an output image data to be formed into an image by the image forming portion, the orientation of the output image data being determined based on a result of the obtaining step; and
  generating the output image data based on the input image data obtained by the obtaining step and the orientation of the output image data set by the setting step,
wherein in a case where the information obtained by the obtaining step indicates that the second mode is executed by the image forming apparatus upon receiving the image forming job, the setting step is performed such that
  an orientation corresponding to the sheet orientation included in the image forming job is set as the orientation of the output image data if the sheet orientation inputted into the driver software and the sheet orientation stored in the storage portion are consistent, and
  an orientation corresponding to the sheet orientation stored in the storage portion is set as the orientation of the output image data if the sheet orientation inputted into the driver software and the sheet orientation stored in the storage portion are inconsistent.

14. A non-transitory computer-readable storage medium storing a program for causing a computer to execute each step of the control method of the image forming system as set forth in claim 13.

15. A control method of an image forming system that includes an image forming apparatus and a host computer in which a driver software to generate an image forming job is installed, the image forming apparatus including: a sheet support portion configured to support a sheet; a size detection portion configured to detect a size of the sheet supported by the sheet support portion; an image forming portion configured to form an image on the sheet fed from the sheet support portion; and a storage portion configured to store information of a sheet size and a sheet orientation of the sheet supported on the sheet support portion and information indicating whether an input-free setting that allows to omit an input of the sheet size and the sheet orientation is enabled or disabled, wherein the image forming apparatus is configured to execute, in a case where the image forming apparatus receives the image forming job from the host computer, one of a plurality of modes including a first mode and a second mode, wherein the first mode is a mode in which an image is formed on the sheet by the image forming portion only if a sheet size included in the image forming job is consistent with the sheet size stored in the storage portion, and the second mode is a mode in which an image is formed on the sheet by the image forming portion even if the sheet size included in the image forming job is inconsistent with the sheet size stored in the storage portion,
  the control method comprising:
    obtaining information of the sheet stored in the storage portion, information of the input-free setting, information of the mode to be executed by the image forming apparatus upon receiving the image forming job, and input image data and a sheet orientation inputted into the driver software;
    setting an orientation, with respect to the sheet to be fed from the sheet support portion, of an output image data to be formed into an image by the image forming portion, the orientation of the output image data being determined based on a result of the obtaining step; and
    generating the output image data based on the input image data obtained by the obtaining step and the orientation of the output image data set by the setting step,
  wherein in a case where the information obtained by the obtaining step indicates that the second mode is executed by the image forming apparatus upon receiving the image forming job and that the input-free setting is enabled, the setting step is performed such that either orientation of the sheet orientation inputted into the driver software and the sheet orientation stored in the storage portion is set as the orientation of the output image data depending on the size of the sheet detected by the size detection portion.

16. A non-transitory computer-readable storage medium storing a program for causing a computer to execute each step of the control method of the image forming system as set forth in claim 15.

* * * * *